(12) United States Patent
Senanayake et al.

(10) Patent No.: US 10,291,653 B2
(45) Date of Patent: May 14, 2019

(54) VISUALLY INTUITIVE INTERACTIVE NETWORK MANAGEMENT

(71) Applicant: SRI International, Menlo Park, CA (US)

(72) Inventors: Rukman Senanayake, San Jose, CA (US); Phillip A. Porras, Cupertino, CA (US); Patrick D. Lincoln, Woodside, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 14/733,907

(22) Filed: Jun. 8, 2015

(65) Prior Publication Data

US 2016/0212172 A1 Jul. 21, 2016

Related U.S. Application Data

(60) Provisional application No. 62/104,517, filed on Jan. 16, 2015.

(51) Int. Cl.

| | |
|---|---|
| H04L 29/06 | (2006.01) |
| G06F 3/01 | (2006.01) |
| G06F 3/0481 | (2013.01) |
| G06F 3/0482 | (2013.01) |
| G06F 3/16 | (2006.01) |
| G06F 3/038 | (2013.01) |
| G06F 3/0488 | (2013.01) |
| A63F 13/71 | (2014.01) |

(52) U.S. Cl.
CPC .............. *H04L 63/20* (2013.01); *G06F 3/013* (2013.01); *G06F 3/017* (2013.01); *G06F 3/038* (2013.01); *G06F 3/0482* (2013.01); *G06F 3/04815* (2013.01); *G06F 3/04883* (2013.01); *G06F 3/16* (2013.01); *H04L 63/1408* (2013.01); *H04L 63/1416* (2013.01); *H04L 63/1433* (2013.01); *H04L 63/1441* (2013.01); *A63F 13/71* (2014.09); *A63F 2300/308* (2013.01); *G06F 2203/0381* (2013.01)

(58) Field of Classification Search
None
See application file for complete search history.

(56) References Cited

U.S. PATENT DOCUMENTS

| | | | |
|---|---|---|---|
| 7,890,869 B1 * | 2/2011 | Mayer | G06F 21/577 709/224 |
| 8,650,492 B1 * | 2/2014 | Mui | G06F 17/30873 715/736 |

(Continued)

OTHER PUBLICATIONS

U.S. Appl. No. 14/773,899, filed Jun. 8, 2015, Interview Summary, dated Aug. 14, 2017.

(Continued)

*Primary Examiner* — Andrew J Steinle
(74) *Attorney, Agent, or Firm* — Hickman Palermo Becker Bingham LLP

(57) ABSTRACT

Network security management technology as disclosed herein generates and dynamically updates an intuitive, interactive visualization of a computer network in live operation. The network security management technology interprets human user interactions, such as gestures, as network directives, and updates the interactive visualization in response to the network directives.

36 Claims, 11 Drawing Sheets

(56) References Cited

U.S. PATENT DOCUMENTS

| | | | |
|---|---|---|---|
| 8,955,122 B2 | 2/2015 | Gu et al. | |
| 9,026,840 B1* | 5/2015 | Kim | G06F 21/552 |
| | | | 714/4.3 |
| 9,088,615 B1* | 7/2015 | Avlasov | H04L 63/20 |
| 2006/0010485 A1* | 1/2006 | Gorman | G06F 21/57 |
| | | | 726/3 |
| 2009/0064332 A1 | 3/2009 | Porras et al. | |
| 2010/0199228 A1* | 8/2010 | Latta | G06F 3/011 |
| | | | 715/863 |
| 2011/0010633 A1* | 1/2011 | Richmond | H04L 41/12 |
| | | | 715/736 |
| 2011/0246897 A1* | 10/2011 | Lee | G06Q 10/10 |
| | | | 715/735 |
| 2012/0313854 A1 | 12/2012 | Senanayake et al. | |
| 2013/0311508 A1 | 11/2013 | Senanayake et al. | |
| 2013/0346168 A1* | 12/2013 | Zhou | G06F 1/163 |
| | | | 705/14.4 |
| 2014/0331280 A1 | 11/2014 | Porras et al. | |
| 2015/0116327 A1* | 4/2015 | Nielsen | G06T 17/00 |
| | | | 345/427 |
| 2015/0128274 A1* | 5/2015 | Giokas | H04L 63/1425 |
| | | | 726/23 |

OTHER PUBLICATIONS

U.S. Appl. No. 14/807,782, filed Jul. 23, 2015, Office Action, dated Jul. 3, 2017.
U.S. Appl. No. 14/733,899, filed Jun. 8, 2015, Office Action, dated Aug. 17, 2016.
Senanayake, U.S. Appl. No. 14/733,907, filed Jun. 8, 2015, Final Office Action, dated Dec. 6, 2017.

* cited by examiner

VISUALLY INTUITIVE INTERACTIVE NETWORK MANAGEMENT

CROSS-REFERENCE TO RELATED APPLICATIONS

This application claims the benefit of and priority to U.S. Provisional Patent Application Ser. No. 62/104,517, filed Jan. 16, 2015, which is incorporated herein by this reference in its entirety.

BACKGROUND

This disclosure relates to the technical field of computer network security. Computer networks are at risk of a variety of different types of attacks. For example, a network intruder or malicious software may intercept data communications traveling through the network, or initiate commands that disrupt the network's normal operation. Some commonly known types of network attacks include wiretapping, port scanners, idle scans, denial-of-service attacks, spoofing, and cyber-attacks. Traditionally, a network is secured by a implementing a well-defined security policy that is instantiated for the particular network topology. In traditional network environments, the security policy is often deployed and enforced statically and consistently across the entire network infrastructure.

Software-defined networking refers to an approach for building a computer network that allows for programmable network switch infrastructures, in which the rules that determine how the network switches are to process network flows can be dynamically specified and changed. Such programmability is useful, for instance, in the management of virtual computing resources that may be spawned or terminated on demand. The OPENFLOW network model is one example of a protocol that may be used to implement software-defined networking.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
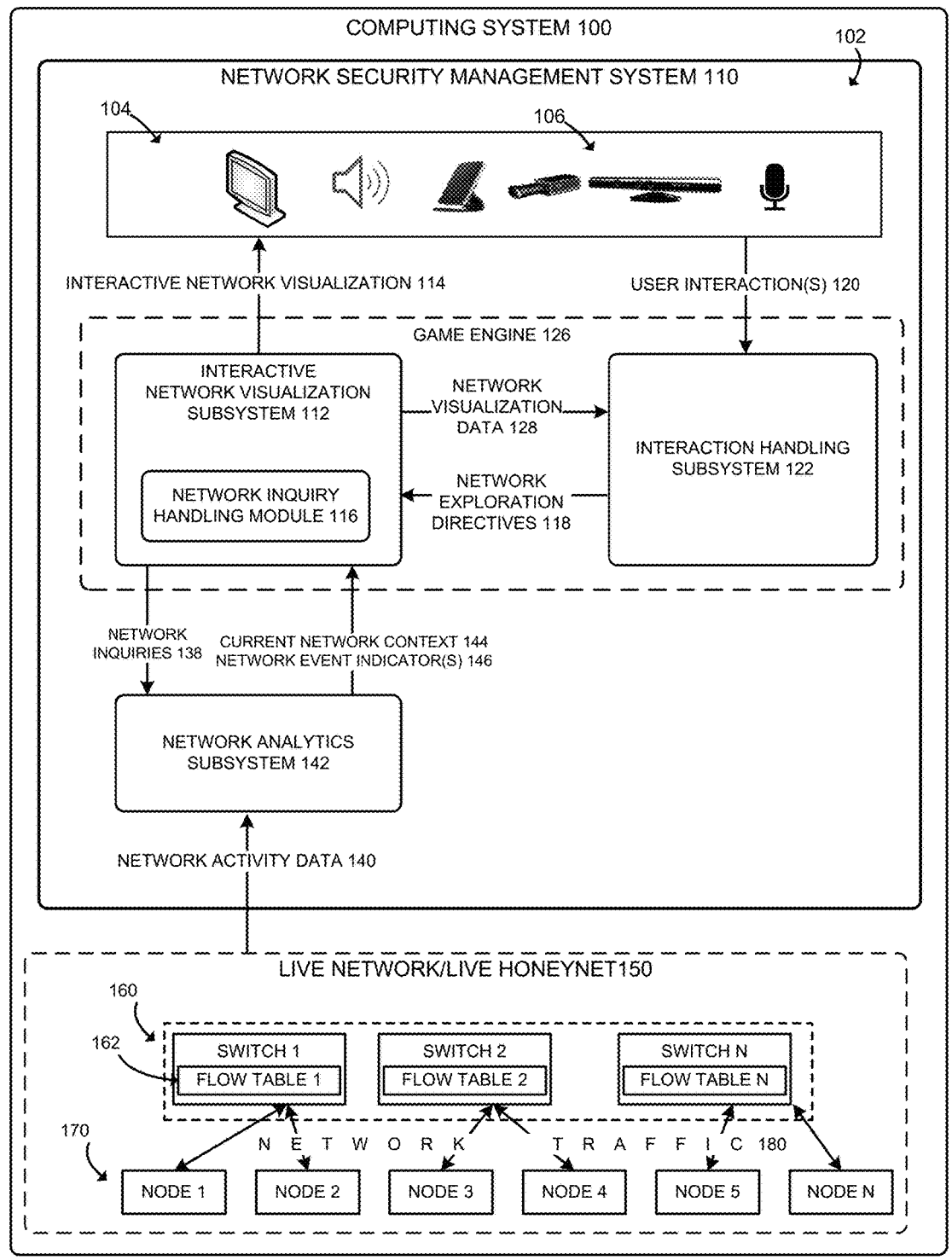
FIG. 1 is a simplified schematic diagram of at least one embodiment of an environment of a computing system, including a network security management system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Network security management often requires administrators to review and analyze large amounts of network data in order to identify suspicious behavior or network threats. The voluminous data makes it difficult for humans or computers to quickly extract meaningful insights. To the extent that network visualization tools are available, mechanisms for initiating remedial or preventative measures are not well integrated with such tools. As a result, network managers suffer from a complexity burden, which slows their ability to identify problems on the network and implement effective measures to combat those problems.

Dynamically programmable networks, some embodiments of which may be referred to as software-defined networks or SDNs, can enable a flexible and adaptable network infrastructure, but also present new and unique challenges to the effective enforcement of traditional security policies. Along with its many benefits, SDN technology can create new, unintended opportunities for determined adversaries to invade and subvert network operations by dynamically reprogramming and manipulating the behavior of the network switching infrastructure.

Referring now to FIG. 1, an embodiment of a network security management system 110 is embodied in one or more computing devices of a networked computing system 100. In the illustrative embodiment, the network security management system 110 establishes an environment 102 during operation (e.g., a native or virtual execution or "runtime" environment). The illustrative environment 102 includes an interactive network visualization subsystem 112, an interaction handling subsystem 122, and a network analytics subsystem 142. In some embodiments, the interactive network visualization subsystem 112 and the interaction handling subsystem 122 may be embodied as components of user interface subsystem, which may include a game engine 126. The game engine 126 may operate the visualization 114 using a video gaming paradigm. Each of the interactive network visualization subsystem 112, the interaction handling subsystem 122, and the network analytics subsystem 142 is embodied as computer software, firmware, hardware, or a combination thereof. For example, any of the components of the network security management system 110 may be embodied as software written in a programming language such as Java and/or Python.

The network security management system 110 interfaces with a live network or live honeynet ("network") 150. As used herein, "network" may refer to a computer network that is managed by a human network administrator. The illustrative network 150 is implemented as a packet-switching digital communications network. As used herein, "packet" may refer to, among other things, a data packet, a network packet, a set of data and/or control communications, or portions of such communications, which are transmitted between nodes or otherwise travel on the network 150.

The network 150 may be configured as a public, private or semi-private wired or wireless network defined by a network boundary, where the network boundary may establish a firewall between the network and one or more external networks, such as other private or semi-private networks or public networks, e.g., the Internet. As used herein, "node" may refer to any type of computing device, peripheral component, or other electronic device (e.g., a smart appliance) that is connected to the network 150, including client machines and servers. An "internal node" may refer to a node that is within the boundary of the network 150, while an "external node" may refer to a node that is outside the network boundary, such as a cloud server or other computer to which one or more internal nodes can be connected via the Internet.

In some embodiments, the network 150 may be implemented as a dynamically programmable computer network, e.g., using a software-defined networking approach (such as the OPENFLOW protocol). In some embodiments, the network 150 may correspond to a physical or logical (e.g., virtualized) subset of a larger network, such as a "network slice." In some embodiments, the network 150 or portions of the network 150 may be embodied as a honeynet. As used herein, "honeynet" may refer to a network or simulated network that is configured for security purposes. For example, a honeynet may appear to be a legitimate network but intentionally set up with security vulnerabilities in order to invite attacks, so that attack activities and their perpetrators can be identified and analyzed in order to improve network security.

The network security management system 110 generates an interactive network visualization 114 based on network activity data 140 and other information, as described in more detail below. As used herein, "visualization" may refer to the use of computer graphics techniques to present information visually. For example, the visualization 114 may include two-dimensional and/or three-dimensional graphics, images, videos, diagrams, animations, text, audio (e.g., non-speech sounds, music, and/or speech), other forms of multimedia content, or a combination thereof. The illustrative visualization 114 is dynamically adjustable in that the content or presentation of the visualization can change to reflect activities and events that occur on the network 150 during live operation of the network 150. The illustrative visualization 114 is also interactive in that the view of the visualization 114 that is presented to the user can change in response to user interactions 120, such as queries and view manipulations, as described in more detail below. For example, the point of reference from which the visualization 114 is presented can be changed and/or the level of detail of the information presented in the visualization 114 can be dynamically adjusted, in order to facilitate intuitive user exploration of the network 150.

The network security management system 110 presents the interactive network visualization 114 to a network administrator (e.g., a human network security manager or "user") by way of one or more user interface devices 104. As used herein, the term "network administrator" may refer to a human operator and/or a computerized agent or delegate of a human operator, such as a software application that acts under the direction of or in response to inputs from the human operator. As such, the network security management system 110 or portions thereof may be implemented as a network management software application. The user interface device(s) 104 may be embodied as, for instance, a touchscreen display device, such as may be implemented in a smart phone, desktop, laptop, or tablet computer), a wearable computing device (e.g., smart glasses, virtual reality goggles, or a heads-up display), a computer monitor, a television, a projection system, or another type of display device. The user interface device(s) may also include audio equipment, such as speakers and headphones or earbuds, to provide a multimedia experience.

The network security management system 110 interfaces with one or more user interaction detection devices 106, which are configured to detect and capture user interactions 120 made by the user in relation to the interactive network visualization 114. The user interaction detection device(s) 106 may include the interactive display device 104 and/or other human activity detection devices (e.g., various types of sensors, including motion sensors, kinetic sensors, proximity sensors, thermal sensors, pressure sensors, force sensors, inertial sensors, cameras, microphones, gaze tracking systems, and/or others). The types of user interactions 120 captured by the user interaction detection device(s) 106 can include "contact-free" gestures (e.g., hand waves, pointing, clapping, head nods or head tilts, etc., made at a distance away from the display device 104), touch-based gestures (e.g., taps, swipes, pinching, circling, etc., in contact with the display device 104), vocal utterances (e.g., natural language dialog speech or commands), gaze focus, location and/or duration, and/or other types of human activity, or a combination of different types of human activity (e.g., a temporal sequence or contemporaneous occurrence of gesture and voice audio).

The illustrative network security management system 110 interprets the user interactions 120 and converts the user interactions 120 to network exploration directives 118. As used herein, "network exploration directive" may refer to a description of an action that the user desires to be implemented by the interactive network visualization subsystem 112 with respect to a current view of the visualization 114. For instance, a network exploration directive 118 may be embodied as a natural language instruction such as "zoom in to that subnet" or "rotate this view by 45 degrees," or as one or more device-level instructions corresponding to a higher-level directive. Other examples of network exploration directives 118 involve querying the system 110 for specific data, for example, to request that the visualization 114 display additional details about the current behavior of a network flow or node. In some embodiments, network exploration directives 118 may be implemented directly as executable instructions. When the network security management system 110 interprets a user interaction 120 as a network exploration directive 118, the system 110 may utilize a network inquiry handling module 116 to generate a network inquiry 138 and/or proceed to manipulate at least a portion of the view of the interactive network visualization 114 in accordance with the particulars (e.g., arguments or parameters) of the network exploration directive 118. By presenting the voluminous and complex network data as an intuitive visualization and enabling interaction with the visualization via natural human interactions such as gestures, gaze, and/or spoken dialog, the network security management system 110 can greatly simplify the network management tasks of the human administrator.

Referring now in more detail to the components of the embodiment of the network security management system 110 shown in FIG. 1, the illustrative network 150 includes a plurality of network switching devices 160 (e.g., switch 1, switch 2, switch "N," where "N" is a positive integer) and a plurality of nodes 170. The network switching devices 160 each may be embodied as, for example, a switch, a router, a load balancer, a learning switch, or another type of network device. Each of the nodes 170 may be embodied as any suitable type of computing resource, e.g., client device, a server computer, group of server computers, or one or more other devices that are configured to communicate with the switches 160 to send and receive data packets over the network 100. For simplicity, the illustrative network 150 is shown with a fixed number of nodes 170 per switch 160; however, the network 150 may include any number of nodes 170 in communication with any number of switches 160.

Figure 2:
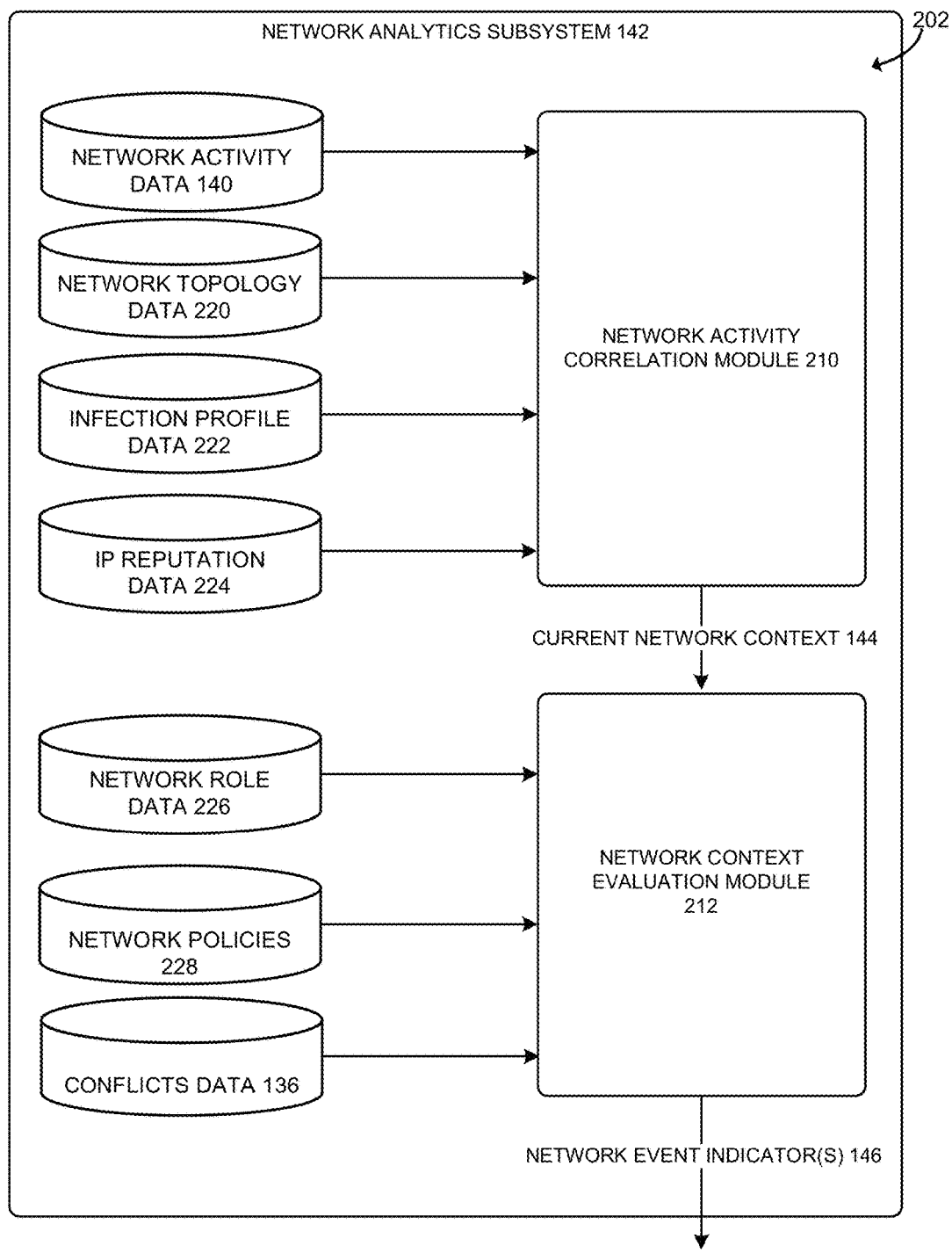
FIG. 2 is a simplified schematic diagram of at least one embodiment of an environment that may be established by a network analytics subsystem of the network security management system of FIG. 1.

The switches 160 each communicate with one or more of the nodes 170 to effectuate the flow of network traffic 180 across the network 150 in accordance with a network security policy or policies 228 (FIG. 2). As used herein, terms such as "network traffic" and "network flow" may refer to, in the context of the network 150, groups or sequences of data packets from a source computer to a destination, where the destination may be, for example, another host, a multicast group, or a broadcast domain. In some cases, network flow may refer to a logical equivalent of a call or a connection. A network flow may include all of the data packets in a specific transport connection or media stream. However, a network flow need not be directly mapped to a transport connection. A network flow can also be thought of as a set of data packets that pass an observation point in the network 150 during a certain time interval.

In a dynamically-programmable network, a security policy 228 may be implemented at the switches 160 as a number of network flow rules, which are maintained at the switches 160 in local flow tables 162 (e.g., flow table 1, flow table 2, flow table "N," where "N" is a positive integer). The local flow tables 162 are used by their respective switches 160 to instantiate flow rules at the switch 160 and direct the network traffic 180 between the nodes 170.

During live operation of the network 150, the network components (e.g., switches 160 and nodes 170) generate network activity data 140. The network activity data 140 may be embodied as, for example, security logs, access control logs, etc. For example, the network activity data 140 may be indicative of one or more network flows identified within the network traffic 180. The network activity data 140 may include data describing attributes, statistics, counters, or other data relating to network flows, individually or collectively, within the network traffic 180. The network activity data 140 may include computed data, such as aggregate statistics describing network activity for all or a portion of the network 150 during one or more discrete time intervals. The network activity data 140 may be generated by, e.g., one or more network sensors or passive network monitoring programs.

Illustrative, non-limiting examples of network activity data 140 relating to network flows include the source and destination Internet address (e.g., the IP addresses associated with the TCP session initiator and TCP server, respectively) of the flows, the source and destination port, protocol (e.g., TCP or UDP (User Datagram Protocol), start time, end time, or duration. The network activity data 140 may include statistical information on data transferred, including the number of zero-length packets sent by the client or the server, the number of nonzero-length packets (i.e., data packets) sent by the client or the server, the total number of bytes produced by the client or the server, the total number of packets produced by the client or the server, or the average size of data packets produced by the client or the server. The network activity data 140 may include geographical data associated with the endpoints (i.e., the client and server) of the network flows. The geographical data may include any data describing the physical location of an endpoint, such as the country name, country code, city, or geographical coordinates. The geographical data may be described using, for example, an IP geolocation database such as MaxMind® GeoIP®. The network activity data may include domain names associated with the endpoints of the identified network flows. In some embodiments, the network flows may be associated with domain names observed in a DNS (Domain Name System) query.

The illustrative network analytics subsystem 142 is embodied as one or more components or modules that analyze the network activity data 140 over time to determine network flow characteristics and node behaviors that may indicate the existence of a network infection or some other type of network threat. The network analytics subsystem 142 generates data indicative of a current network context 144 and, particularly when an infection or threat is detected, one or more network event indicators 146. As used herein, "current network context" may refer to data indicative of a current state of the network 150 in which data communications are taking place. The network activity data 140 may include historical records of network activity.

The data generated by the network analytics subsystem 142 may be diagnostic or predictive. For example, the current network context 144 may include data indicative of the number of local nodes 170, the hardware or software configuration of the nodes 170, the endpoints and directions of network flows (where an "endpoint" may be, for example, an internal node or an external node), duration of connections between two endpoints, flow volume, patterns of network flows, patterns of node behavior, security threats detected, infections detected, nodes currently involved in or likely to be affected by security threats or infections, and/or other network activity. Some illustrative, non-limiting examples of technology available from SRI International that may be utilized by the network analytics subsystem 142 to analyze current network conditions, diagnose infections, identify network threats, or predict network events, are described in U.S. Pat. No. 8,955,122, filed on Apr. 4, 2008, and titled "Method and Apparatus for Detecting Malware Infection"; U.S. Pat. No. 9,083,712, filed on Apr. 4, 2008, and, titled "Method and Apparatus for Generating Highly Predictive Blacklists"; and U.S. patent application Ser. No. 14/322,692, filed on Jul. 2, 2014, and titled "Network Privilege Manager for a Dynamically Programmable Computer Network", all of SRI International. An embodiment of the network analytics subsystem 142 is described in more detail below, with reference to FIG. 2.

The illustrative interactive network visualization subsystem 112 is embodied as one or more components or modules that convert the data indicative of the current network context 144 and the network event indicators 146, output by the network analytics subsystem 142, to the interactive network visualization 114. For example, components of the interactive network visualization subsystem 112 may be embodied in software using commercially available data visualization software, such as a publicly available runtime library or toolkit. The network visualization subsystem 112 includes the network inquiry handling module 116. The illustrative network inquiry handling module 116 is configured to generate network inquiries 138 as needed to obtain data such as the current network context 144 and network event indicators 146 from the network analytics subsystem 142. The network inquiries 138 are embodied as executable queries that are formatted according to the requirements of the respective component of the network analytics subsystem 142. In some embodiments, the network analytics subsystem 142 may include a suite of different software components that each perform different network diagnostic or analytics functions, and the network inquiry handling module 116 may translate a network exploration directive 118 into a query format that is usable by one or more of these software components. For instance, where a user interaction 120 includes a pointing gesture directed at a specific on-screen element of the visualization 114, the network exploration directive 118 may include a request to provide more detailed current network context data 144 specifically relating to the pointed-to on-screen element (which may be representative of a data flow or node on the network 150). In this case, the network inquiry handling module 116 may determine the relevant components of the network analytics subsystem 142 to query in order to provide the requested data, translate the network exploration directive 118 into a set of network inquiries 138 including one or more structured commands to be executed by the relevant components of the network analytics subsystem 142, and forward the network inquiries 138 to the respective components of the network analytics subsystem 142.

The visualization 114 graphically depicts network links and flows, and highlights diagnosed infections and network threats. In some embodiments, such as those shown in FIGS. 5A, 5B, 7A, 7B, 7C, and 7D, the visualization 114 is implemented using a "virtual world" style interface based on a gaming visualization paradigm. An embodiment of the interactive network visualization subsystem 112 is described in more detail below, with reference to FIG. 3.

The illustrative interaction handling subsystem 122 is embodied as one or more components or modules that detect, capture, and interpret user interactions 120, including gesture-based interactions, and convert the user interactions 120 to network exploration directives 118, as the case may be. Some illustrative, non-limiting examples of technology available from SRI International that may be utilized by the interaction handling subsystem 122 to capture and interpret user interactions are described in the following patent applications of SRI International: U.S. patent application Ser. No. 13/158,109, filed on Jun. 10, 2011, titled "Adaptable Input/Output Device" and U.S. patent application Ser. No. 13/631,318, filed on Sep. 28, 2012, and titled "Method, Apparatus, and System for Facilitating Cross-Application Searching and Retrieval of Content Using a Contextual User Model". An embodiment of the interaction handling subsystem 122 is described in more detail below, with reference to FIG. 4.

Referring now to FIG. 2, an embodiment of the network analytics subsystem 142 is shown in more detail. The illustrative network analytics subsystem 142 establishes an environment 202 during operation (e.g., a native or virtual execution or "runtime" environment). The environment 202 includes a network activity correlation module 210 and a network context evaluation module 212, which interface with data stores containing the network activity data 140, network topology data 220, infection profile data 222, IP reputation data 224, network role data 226, network policies 228, and conflicts data 136. Portions of the network activity data 140, network topology data 220, infection profile data 222, IP reputation data 224, network role data 226, network policies 228, and conflicts data 136 may be received, accessed or obtained from other systems and stored in computer memory, e.g., in a searchable data structure such as a database, table, data file, or XML (eXtensible Markup Language) data structure. The components and modules shown in FIG. 2 may each be embodied as hardware, firmware, software, or a combination thereof (e.g., software written using a programming language such as Java and/or Python).

The illustrative network activity correlation module 210 is configured to determine the current network context 144, continuously or periodically at discrete time intervals. Particularly in embodiments in which the network 150 is implemented as a dynamically programmable network, the current network context 144 may be indicative of the dynamic properties of the network traffic 180; that is, the current network context 144 reflects, e.g., the current behavior of nodes 170 on the network 150 at a discrete time instance. The current network context 144 may include any data or relationship associated with the current dynamic state of the network flows within the network traffic 180. The network activity correlation module 210 may determine the current network context 144 based on any combination of network activity data 140, network topology data 220, infection profile data 222, IP reputation data 224, and/or other data.

The network activity correlation module 210 may periodically determine the current version of network activity data 140, network topology data 220, infection profile data 222, IP reputation data 224, network role data 216, and/or network policies 228, at a given time instance, and algorithmically correlate portions of such data to identify and/or network threats and infections. Such correlating may involve, for example, querying one or more of the data 140, 220, 222, 224 to determine matching attributes, executing pattern matching algorithms, etc. For example, the network activity correlation module 210 may correlate IP reputation data 224 indicating that a particular external node is on a blacklist with current network activity data 140 indicating that an internal node is currently connected to the blacklisted node. As another example, the network activity correlation module 210 may predict that an internal node may be at risk of a security attack based on its proximity in the network topology to another node that has already experienced the security attack. Illustrative, non-limiting examples of technology that can be used to correlate network threat and/or infection data with current network activity data are described in the aforementioned U.S. Pat. No. 8,955,122 ("Method and Apparatus for Detecting Malware Infection"); and in the following patent applications of SRI International: U.S. Patent Application Publication No. 2009/00064332 ("Method and Apparatus for Generating Highly Predictive Blacklists"); and U.S. Patent Application Publication No. 2014/0331280 ("Network Privilege Manager for a Dynamically Programmable Computer Network").

The network activity data 140 may indicate, in addition to node behavior and flow information, specific details about the nodes' current activity. For instance, the network activity data 140 may identify software applications currently running on a particular node and/or connections made by those software applications. The illustrative network topology data 220 may be obtained from, e.g., a network management software system used to configure and manage the network 150, and may include data indicative of the number, type, and arrangement of nodes 170 and switching devices 160 on the network 150. For instance, the network topology data 220 may identify nodes by internet protocol (IP) address, and also indicate the device type (e.g., server, desktop, mobile device, etc.), connection type (e.g., wired, WI-FI, or cellular), operating system platform (e.g., ANDROID, WINDOWS, IOS), neighboring nodes, etc. The infection profile data 222 includes, for example, statistical information based on historical infection data, or other information which indicates typical patterns or behaviors of known infections.

The IP reputation data 224 includes a list of known malicious Internet addresses and associated data describing the malicious addresses, the type of threat, and other information relating to the trustworthiness of the malicious Internet address. For example, the IP reputation data 224 may be embodied as a large-scale network address blacklist. Alternatively or in addition, the IP reputation data 224 includes a list of Internet addresses and associated data describing addresses that are known to be acceptable or permitted in accordance with a security policy 228 (e.g., a whitelist). Collectively or individually, the various types of IP reputation data 224 may be referred to as access control data. Along with the malicious or acceptable IP address, as the case may be, the IP reputation data 224 may also identify other data associated with the IP address, such as one or more threat types associated with a malicious address. The threat types may identify the malicious address as associated with, for example, a malware drive-by exploit site, an Internet site associated with malware, a malware command and control site, an aggressive Internet scanner, a site associated with email abuse or spam, a malicious advertisement site, or any other threat type. Also, the IP reputation data 224 may include other data associated with the malicious IP address, such as the associated Internet service provider, domain name, ASN (Autonomous System Number) numeric code, AS (Autonomous System) identity, estimated network speed, geographical data, or business sector. In some embodiments, the IP reputation data 224 may include corroboration data indicating whether other worldwide data sources have also identified the malicious IP address as associated with malware, ASN threat percentile data indicating the relative percentile of malicious IP addresses concentrated within the ASN, or an indication of whether the domain associated with the malicious IP has been created within the last thirty days. The IP reputation data 224 may be updated regularly (e.g., daily) or as new threats are identified.

The network activity correlation module 210 outputs the current network context 144 for evaluation by the network context evaluation module 212. The network context evaluation module 212 applies network role data 226 and/or network policies 228 to the current network context 144 to evaluate the current network context 144 based on the role data 226 and/or policies 228. To do this, the network context evaluation module 212 may determine the network policies 228 and/or role data 226 that match the current network context 144 (e.g., by running queries or similarity algorithms). The network context evaluation module 212 may select applicable network policies 228 based on criteria that match, e.g., the current network activity data 140, the IP reputation data 224, and/or the network role data 226. For instance, the network context evaluation module 212 may apply a matching threshold and/or duration to the applicable security policies 228. The matching threshold and duration may require that at least a certain number of network flows be matched within a given duration prior to triggering identification of a network event. As another example, the network context evaluation module 212 may require a threshold number of matching network flows originating from the same source address to trigger the identification of a network event. The network context evaluation module 212 may generate one or more network event indicators 146 based on its evaluation of the current network context 144.

The illustrative network role data 226 may define abstract network roles and associate the network roles with particular network addresses, subnets, or other address specifiers. The network role data 226 may be prepared by a network administrator to correspond to the topology or other design of the network 150. For example, the network role data 226 may group addresses into types of machines (e.g., workstation, server, peripheral device, etc.). As another example, the network role data 226 may segment the network 150 into functional tiers or zones (e.g., web tier, database tier, application tier, etc.). Example roles may include workstation, peripheral, application server, network device, ignored device, infrastructure asset, or any other network role that may be defined by a network administrator. Network roles may be defined hierarchically or otherwise tailored to particular network topologies. For example, network roles may be grouped into one or more super-roles or tiers (e.g., a web tier, application tier, and database tier). The network role data 216 may be configured by a network administrator, for example using one or more configuration files.

The network policies 228 may be defined by a network administrator and may specify the rules for handling various different types of network conditions and events. As noted above, in dynamically programmable networks, the policies 228 can be flexible to adapt to changing network conditions or even to conditions at a particular node 170 or switching device 160. The network policies 228 may be embodied as any appropriate data format, including, for example, as one or more extensible markup language (XML) files. In some embodiments, each policy 228 may specify a set of criteria to be matched against the current network context 144. A policy 228 may specify a response to be generated when matching traffic is encountered. The response may include any directive, command, handling decision, or other action to enforce the network security policy. For example, the response may be embodied as a directive to drop all flows matching the criteria, block a particular address, quarantine a particular address, redirect flows from a particular address, ignore all records matching the criteria, produce a warning for each record matching the criteria, log each record matching the criteria, execute an arbitrary shell command, or any other action.

The conflicts data 136 may be embodied as, for example, a log file generated by the conflict analyzer module 526 of FIG. 5, discussed below. The conflicts data 136 may include historical data relating to conflicts between candidate network executable actions 132 generated by the security initiative translator module 510 and existing network policies 228, as detected by the conflict analyzer module 526, as well as data indicating how those conflicts were resolved by the conflict analyzer module 526.

As a result of its evaluation of the current network context 144, the network context evaluation module 212 may identify one or more network events in accordance with the role data 226, conflicts data 136, and/or policies 228. For example, the current network context 144 may include data indicative of a network threat, but the network policies 228 or role data 226 may be defined for the network 150 such that the network context evaluation module 212 concludes that the threat does not currently require any action to be taken to respond to the threat. In this case, the network context evaluation module 212 may not output a network event indicator 146 corresponding to the identified network event, or may output a graphical element indicative of the network event but which indicates that the event is currently of lower priority. As the current network context 144 evolves over time, the network context evaluation module 212 may reassess the identified network event according to the new context 144 and may increase the priority of the network event and then output a corresponding network event indicator 146 at that time.

The network context evaluation module 212 outputs network event indicators 146 for visualization by the interactive network visualization subsystem 112. As used herein, a "network event indicator" may refer to data indicative of a network event that is to be included in the visualization 114. Such data may include, for example, node and/or flow identifying information (e.g., IP addresses) identifying nodes and/or flows affected or predicted to be affected by a threat or infection, threat or infection indicators (e.g., the type of threat or infection), threat or infection severity or priority indicators, and/or other data that may be needed by the interactive network visualization subsystem 112 to prepare or update the network visualization 114.

Figure 3:
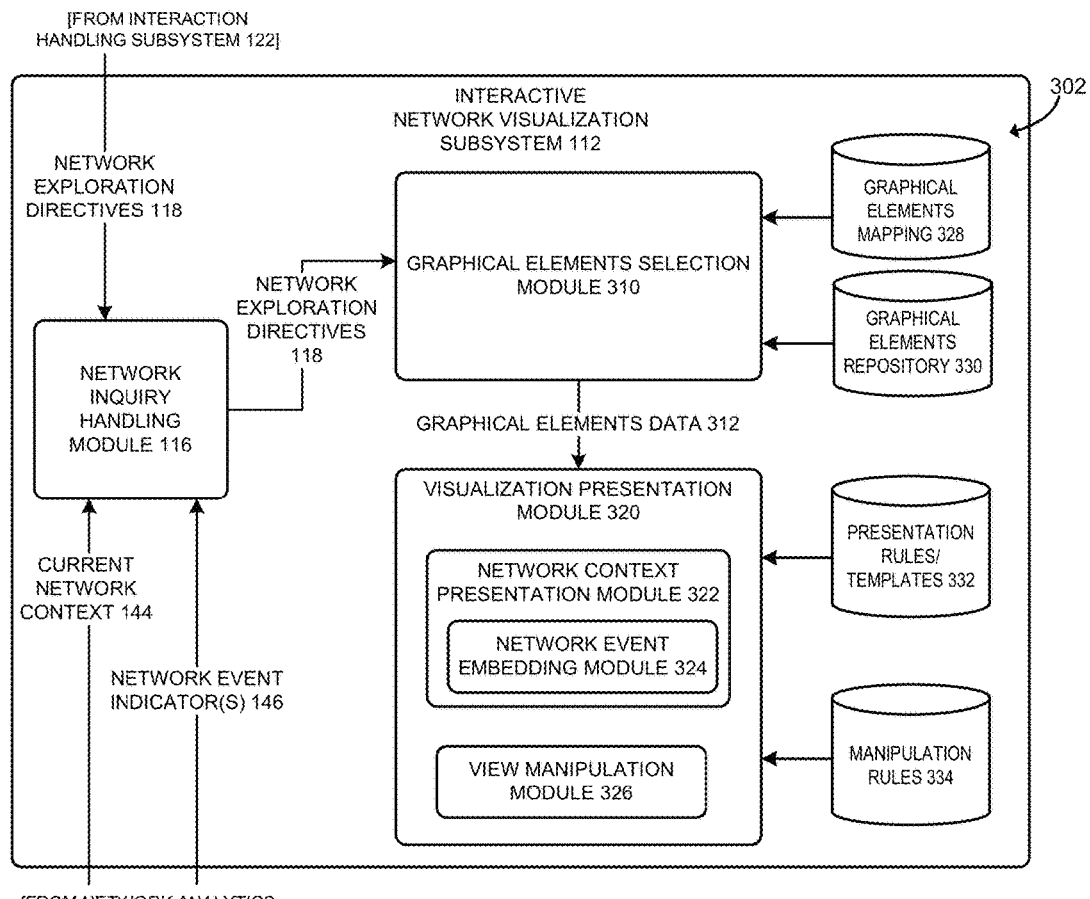
FIG. 3 is a simplified schematic diagram of at least one embodiment of an environment that may be established by an interactive network visualization subsystem of the network security management system of FIG. 1.

Referring now to FIG. 3, an embodiment of the interactive network visualization subsystem 112 is shown in more detail. The illustrative interactive network visualization subsystem 112 establishes an environment 302 during operation (e.g., a native or virtual execution or "runtime" environment). The environment 302 includes the network inquiry handling module 116, a graphical elements selection module 310, a visualization presentation module 320, a network context presentation module 322, a network event embedding module 324, and a view manipulation module 326. The components and modules shown in FIG. 3 may each be embodied as hardware, firmware, software, or a combination thereof (e.g., software code written in a programming language such as Java and/or Python).

The network inquiry handling module 116 analyzes network exploration directives 118. For example, the network inquiry handling module 116 parses the network exploration directives 118 and determines whether the directives 118 include a request for information that should be translated to a network inquiry 138 to be submitted to the network analytics subsystem 142, or whether the directives 118 include a view manipulation command. If the network exploration directives 118 are to be translated to a network inquiry 138, the network inquiry handling module 116 formulates the requisite query, sends the query to the pertinent component(s) of the network analytics subsystem 142, receives the query results from the network analytics subsystem 142, and incorporates the query results in the network exploration directive 118 for inclusion in the visualization 114. The query results may include a user-requested subset of the current network context data 144 and/or network event indicators 146. If the network exploration directives 118 include a view manipulation command that does not require a network inquiry 138, the network inquiry handling module 116 simply forward the network exploration directives 118 to the graphical elements selection module 310.

The graphical elements selection module 310 analyzes the current network context 144 and the network event indicators 146, and determines the manner in which the current network context 144 and the network event indicators 146 should be represented graphically in the visualization 114, in view of the then-current network exploration directives 118. To do this, the illustrative graphical elements selection module 310 accesses graphical elements mapping data 328. The graphical elements mapping data 328 includes data that associates various different characteristics of the current network context 144 and the network event indicators 146 with graphical elements that may be presented in the visualization 114. For example, if the current context 144 indicates that a client node 170 is currently running a particular operating system platform, the graphical elements mapping 328 may associate the current context 144 with a graphical element that is representative of the operating system platform (e.g., an icon or logo). If the current context 144 indicates that a node 170 is a server node, the graphical elements mapping 328 may associate the current context 144 with a graphical element that visually depicts a server computer (e.g., as distinguished from a client computer or network device). If the network event indicators 146 indicate that a network flow has a destination node that has been compromised by a network infection, the graphical elements mapping 328 may associate the network event indicators 146 with a graphical element that highlights the network flow and/or the compromised destination flow. Many other associations between characteristics of the current network context 144 and/or network event indicators 146 are possible, including associating nodes 170 or switches 160 with graphical elements that visually depict the geographic regions in which such nodes 170 or switches 160 are located, and graphical elements that visually depict different types of network threats, infections, risks, or problem areas. The graphical elements mapping 328 may be embodied as, for example, a searchable database, knowledge base, data file, or mapping table implemented using any suitable form of data structure. The graphical elements mapping 328 may be updated from time to time as new characteristics of the current network context 144 and/or the network event indicators 146 are discovered by the system 110.

Once the graphical elements selection module 310 has determined, e.g., using the graphical elements mapping 328, which graphical elements to use to depict the current network context 144 and network event indicators 146 in the visualization 114, the graphical elements selection module 310 selects the appropriate graphical elements from, e.g., a graphical elements repository 330. The graphical elements repository 330 may be implemented locally or remotely, for example, distributed across a network. The graphical elements repository 330 may store the graphical elements that may be used in the visualization 114 or contain an index that allows the system 110 to access the appropriate graphical elements when needed. Illustrative examples of graphical elements include computer-generated lines, shapes, icons, logos, images, video clips, multimedia objects, color and texture.

The graphical elements selection module 310 outputs or otherwise allows access to graphical elements data 312 by the visualization presentation module 320. The graphical elements data 312 includes the graphical elements to be depicted in the visualization 114, as selected by the graphical elements selection module 310, or data that allows the visualization presentation module 320 to access the selected graphical elements. The illustrative visualization presentation module 320 generates the visualization 114 based on the graphical elements data 312 and other data as needed, including any then-current network exploration directives 118. To prepare the visualization 114, the network context presentation module 322 arranges the graphical elements indicated by the graphical elements data 312 according to presentation rules/templates 332. The presentation rules/templates 332 may be predefined and interactively modifiable computer-readable rules and/or templates that stipulate aspects of the arrangement of graphical elements in the visualization 114 (e.g., rules/templates corresponding to various network exploration directives 118). For example, the presentation rules/templates 332 may indicate that all nodes 170 of a certain type be grouped together, or that network flows should be displayed with animation indicating the direction of the network flow. Using the presentation rules/templates 332, the network context presentation module 322 generates the visualization of the current network context 144. The network event embedding module 324 embeds the graphical elements depicting the network event indicators 146 in the visualization 114 according to the presentation rules/templates 332 in a similar manner. For example, if a network event indicator 146 indicates that a node 170 has been affected by a network threat, the presentation rules/templates 332 may indicate that a graphical element depicting the particular type of network threat is to be overlaid on the graphical depiction of the node 170 in the visualization 114. The presentation rules/templates 332 may also specify other aspects of the visualization 114, such as foreground and background elements, presentation style (e.g., hierarchical tree structure, Sankey diagram, game-like interface, 2D or 3D, etc.). The presentation rules/templates 332 may store in memory using any suitable data structure, e.g., a searchable database or XML data structure.

The illustrative view manipulation module 326 performs a real time, interactive update of the view of the visualization 114 that is presented to the user in response to the network exploration directives 118. The view manipulation module 326 matches network exploration directives 118 to manipulation rules 334 and then implements the network exploration directives 118 in accordance with the matching rules. For example, a network exploration directive 118 may include a command to rotate the view of the visualization by 90 degrees. The corresponding manipulation rule 334 may specify the device-level actions that need to be executed to cause the visualization 114 to rotate by 90 degrees. In some cases, the network exploration directive 118 may be ambiguous, i.e. the system 110 may have a lower degree of confidence that it interpreted the user interaction 120 correctly. In such an event, the manipulation rules 334 may indicate that the system 110 should prompt the user for clarification, e.g., by using a question-and-answer dialog format.

The interactive network visualization subsystem 112 provides or otherwise makes available network visualization data 128 to the interaction handling subsystem 122 for use in the interpretation of user interactions 120. The network visualization data 128 includes descriptive information (e.g., arguments, parameters, etc.) relating to the current view of the visualization 114. Thus, the network visualization data 128 is updated as the view and contents of the visualization 114 are updated (e.g., in response to changing network context and/or implementation of network exploration directives 118).

Figure 4:
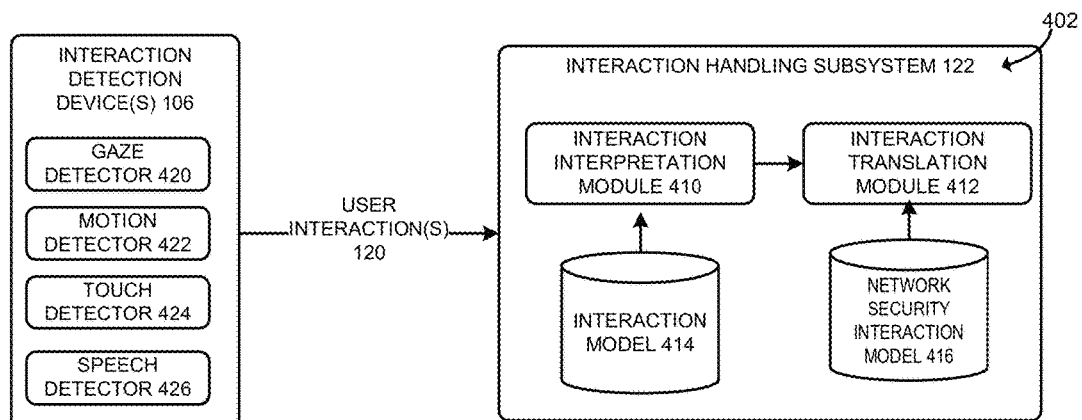
FIG. 4 is a simplified schematic diagram of at least one embodiment of an environment that may be established by an interaction handling subsystem of the network security management system of FIG. 1.

Referring now to FIG. 4, an embodiment of the interaction handling subsystem 122 is shown in more detail. The illustrative interaction handling subsystem 122 establishes an environment 402 during operation (e.g., a native or virtual execution or "runtime" environment). The environment 402 includes an interaction interpretation module 410, an interaction translation module 412, an interaction model 414, and a network security interaction model 416. The interaction handling subsystem 122 analyzes the user interactions 120 and formulates from the user interactions 120 network exploration directives 118 (or determines that the user interactions 120 should be disregarded as not corresponding to network exploration directives 118). As shown in FIG. 4, the interaction detection devices 106 used to capture user interactions 120 can include a gaze detector 420 (e.g., a still-image or video camera), a motion detector 422 (e.g. a kinetic sensor, proximity sensor, accelerometer, gyroscope, or any combination thereof), a touch detector 424 (e.g., a touch sensor of a touchscreen display device), and/or a speech detector 426 (e.g., one or more microphones). The interaction detection devices 106 may be embodied in any component of the network security management system 110, including personal mobile computing devices of the user, enterprise network management devices, standoff sensing devices (such as wall or ceiling mounted cameras and sensors), and/or others. The components and modules shown in FIG. 4 may each be embodied as hardware, firmware, software, or a combination thereof (e.g., software code written in a programming language such as Java and/or Python). Some illustrative technologies for implementing portions of the interaction handling subsystem 122 are described in the aforementioned U.S. patent application Ser. No. 13/158,109 (titled "Adaptable Input/Output Device") and U.S. patent application Ser. No. 13/631,318 titled ("Method, Apparatus, and System for Facilitating Cross-Application Searching and Retrieval of Content Using a Contextual User Model").

The illustrative interaction interpretation module 410 accesses an interaction model 414 and utilizes the interaction model 414 to interpret the user interactions 120, e.g., "what is this interaction?" in the context of the network visualization 114 as reflected in the network visualization data 128 provided by the interactive network visualization subsystem 112. The interaction model 414 may be implemented as rules, templates, or classifiers (e.g., probabilistic or statistical classifiers) that associate interaction data or patterns of interaction data with various types of user interactions. For example, using the interaction model 414, the interaction interpretation module 410 may conclude that a set of motion data output by the motion detector 422 corresponds to a "swipe" gestures and that a different set of motion data corresponds to a "circle" or "point" gesture. Similarly, using the interaction model 414, the interaction interpretation module 410 may determine that a set of gaze data corresponds to a sustained focus at a specific part of the visualization 114. Further, with the interaction model 414, the interaction interpretation module 410 may analyze combinations of different types of user interactions 120, in order to interpret a user interaction. That is, in some embodiments, a "user interaction" may encompass a combination or temporal sequence of different types of sensor outputs. For example, the interaction interpretation module 410 may determine, using the interaction model 414, that a user interaction 120 constitutes a gesture of pointing at a specific part of the visualization 114 and speech containing words including "quarantine that node." The rules, templates, and/or classifiers of the interaction model 414 may be predefined, developed based on experimentation/observation, or learned by applying e.g., machine learning techniques to training data, such as user interaction data for a large population of users or a subset of a larger user population. Portions of the interaction model 414 may be defined or personalized for specific types of users and/or for specific uses of the system 110. For instance, if the system 110 is to be implemented on smaller form factor devices, the interaction model 414 may take that into account when associating user interactions 120 with the interpretations of the user interactions 120.

The illustrative interaction translation module 412 accesses and utilizes a network security interaction model 416 to interpret the interactions 120 in the context of the network security management system 110, e.g., what does this interaction mean in the context of this network visualization 114? The network security interaction model 416 may be implemented as rules, templates, or classifiers (e.g., probabilistic or statistical classifiers) that associate interaction data or patterns of interaction data with various types of actions that may be taken by the system 110 (e.g., network exploration directives 118). For example, the interaction translation module 412 may, with the network security interaction model 416, interpret a gesture that includes pointing at a network flow graphically depicted in the visualization 114 as a network exploration directive 118, or more specifically, as a request for the visualization 114 to "zoom in" or display more information about the pointed-to flow. As another example, the interaction translation module 412 may, with the network security interaction model 416, interpret a "circling" gesture as a network exploration directive 118 or more specifically as a request for the system 110 to zoom in and show more detailed information about a particular section of the network 150.

The rules, templates, and/or classifiers of the network security interaction model 416 may be predefined (e.g., hand crafted), developed based on experimentation/observation, or learned by applying e.g., supervised machine learning techniques to training data, such as user interaction data for a large population of users or a subset of a larger user population. Portions of the network security interaction model 416 may be defined or personalized for specific types of users and/or for specific uses of the system 110. For instance, different network administrators may have different preferences as to the gestures that they would like to use to initiate different network view manipulations, and the network security interaction model 416 can be adapted to include those preferences.

Figure 5A:
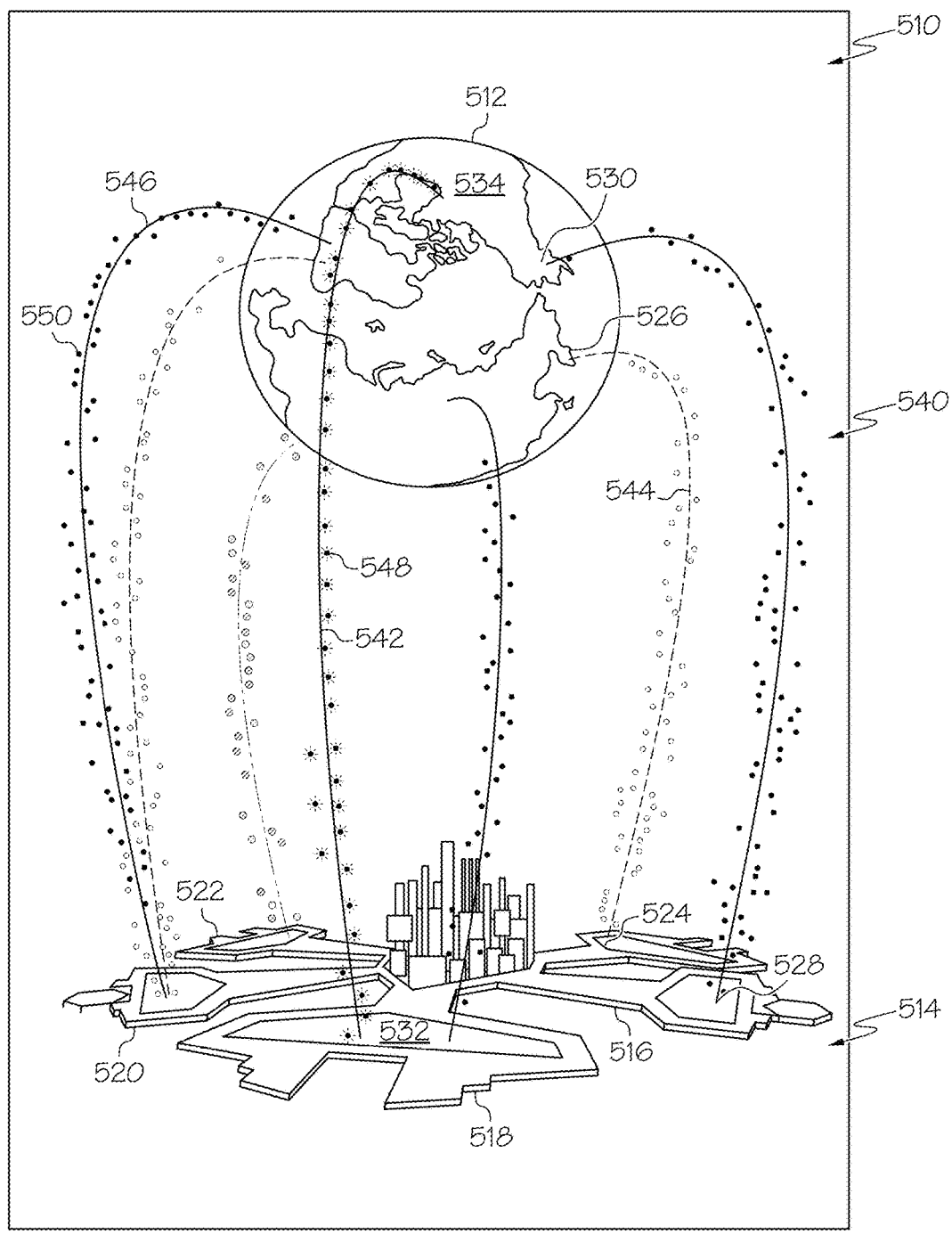
FIGS. 5A and 5B are illustrative example embodiments of interactive visualizations of a computer network as disclosed herein.
Figure 5B:
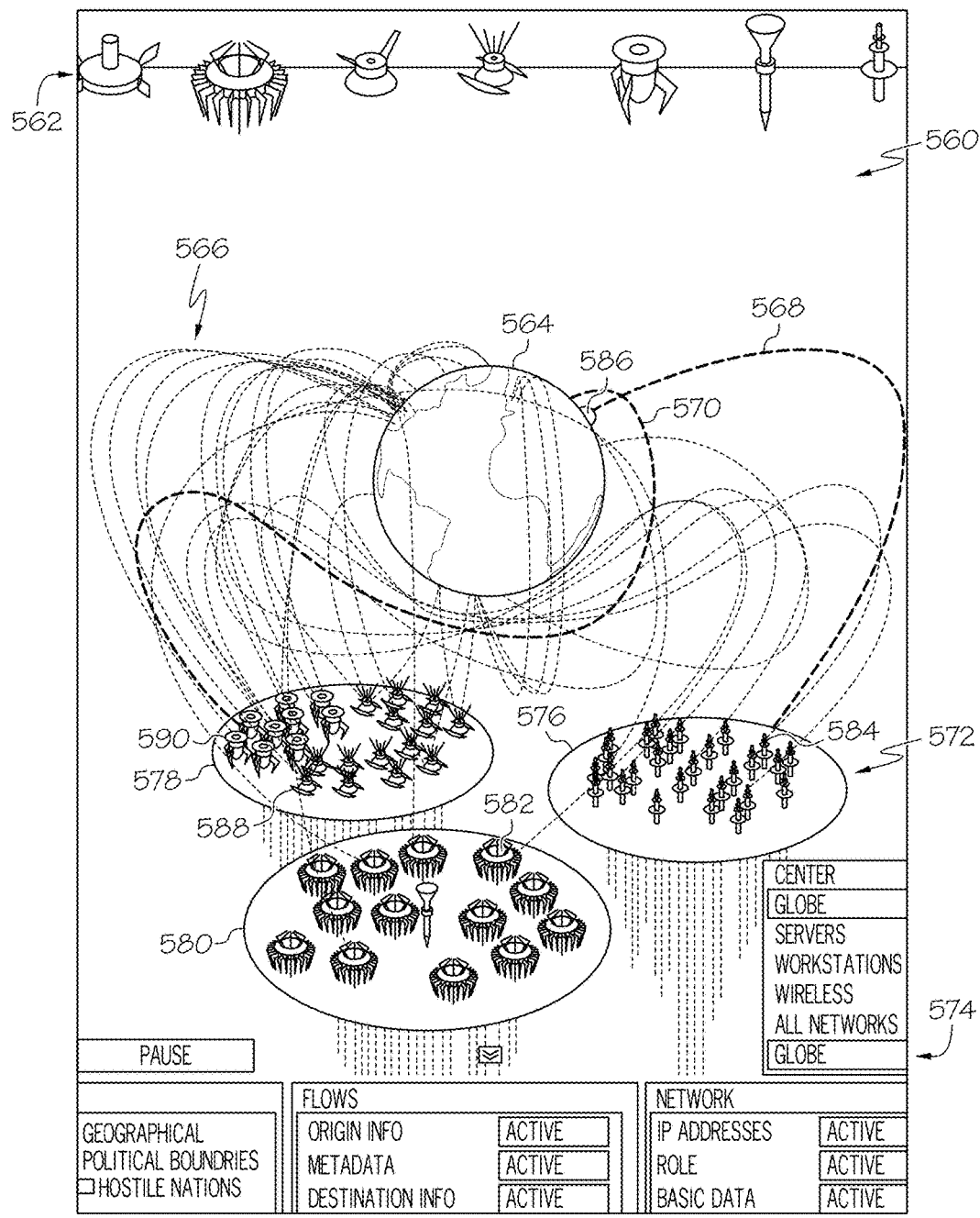

Referring now to FIGS. 5A and 5B, illustrative examples of interactive network visualizations as disclosed herein are shown. In FIG. 5A, a view of a three-dimensional (3D) interactive, virtual world-style game-like visualization 510 is shown. The visualization 510 includes a graphical element 512 depicting geographic regions (e.g., geographic region 534) with which nodes (e.g., nodes 170) of a managed network may connect. The illustrative graphical element 510 is a three dimensional depiction of the Earth, which can be rotated in response to user interactions 120, in order to visualize network flows and connections to different geographic regions of the globe. The visualization 510 graphically represents the internal network topology as a "city" 514 that includes different "towns" or "villages" 516, 518, 520. The network nodes are grouped into different towns or villages based on one or more grouping criterion, such as node type (e.g., client device, server), platform (e.g., ANDROID, WINDOWS, IOS), access type (e.g., wired or wireless), location within the network topology (e.g., subnets), and/or other criteria. Graphical elements 540 indicate network flows between nodes of the internal network (e.g., nodes managed by the network administrator) and external nodes. For example, a node 528 of the village 516 is currently connected to an external node 530. A node 524 of a different village is communicating with an external node 526 as indicated by the graphical element 544, which represents a network flow. The graphical elements 542, 544, 546 each represent different network flows, and the elements 542, 546 are highlighted to indicate that the flows or nodes involved in those connections are currently experiencing a network event. The graphical elements 548, 550 associated with the flows 542, 546, respectively, are configured to represent the different types of network events associated with the flows 542, 546. The flow 544 is not highlighted, thereby indicating that no network events have been detected with respect to the flow 544.

In FIG. 5B, another example of a view of a three-dimensional (3D) interactive, virtual world-style game-like visualization 560 including a graphical depiction of the globe 564 is shown. As with the visualization 510, the visualization 560 can be manipulated (e.g., by zooming in, zooming out, rotating, etc.) to enable the user to visually explore the current network conditions in an intuitive manner. The view 560 represents the current context of a network with graphical elements indicative of current flows 566, nodes 572, and external endpoints (e.g., endpoint 586). Some of the flows 566 are highlighted (e.g., flows 568 and 570) to indicate that a network event has been detected with respect to those flows. The visualization 560 allows the user to customize the visualization 560 by permitting the user to select from a number of graphical elements 562 those elements to be used to represent different nodes on the network. The visualization 560 groups the network nodes by one or more grouping criterion, and visualizes the node groups as "plates" 576, 578, 580. Within each plate 576, 578, 580, the nodes may be grouped by one or more additional grouping criteria. For example, on the plate 578, the nodes are grouped by node type as represented by the user-selected icons, e.g., 588, 590, representative of the different node types. Other node types, represented e.g., by user-selected icons 582, 584, are grouped with similar nodes on plates 580, 576, respectively. The visualization 560 also includes textual data 574, which includes additional details of the current network context 144.

Figure 6:
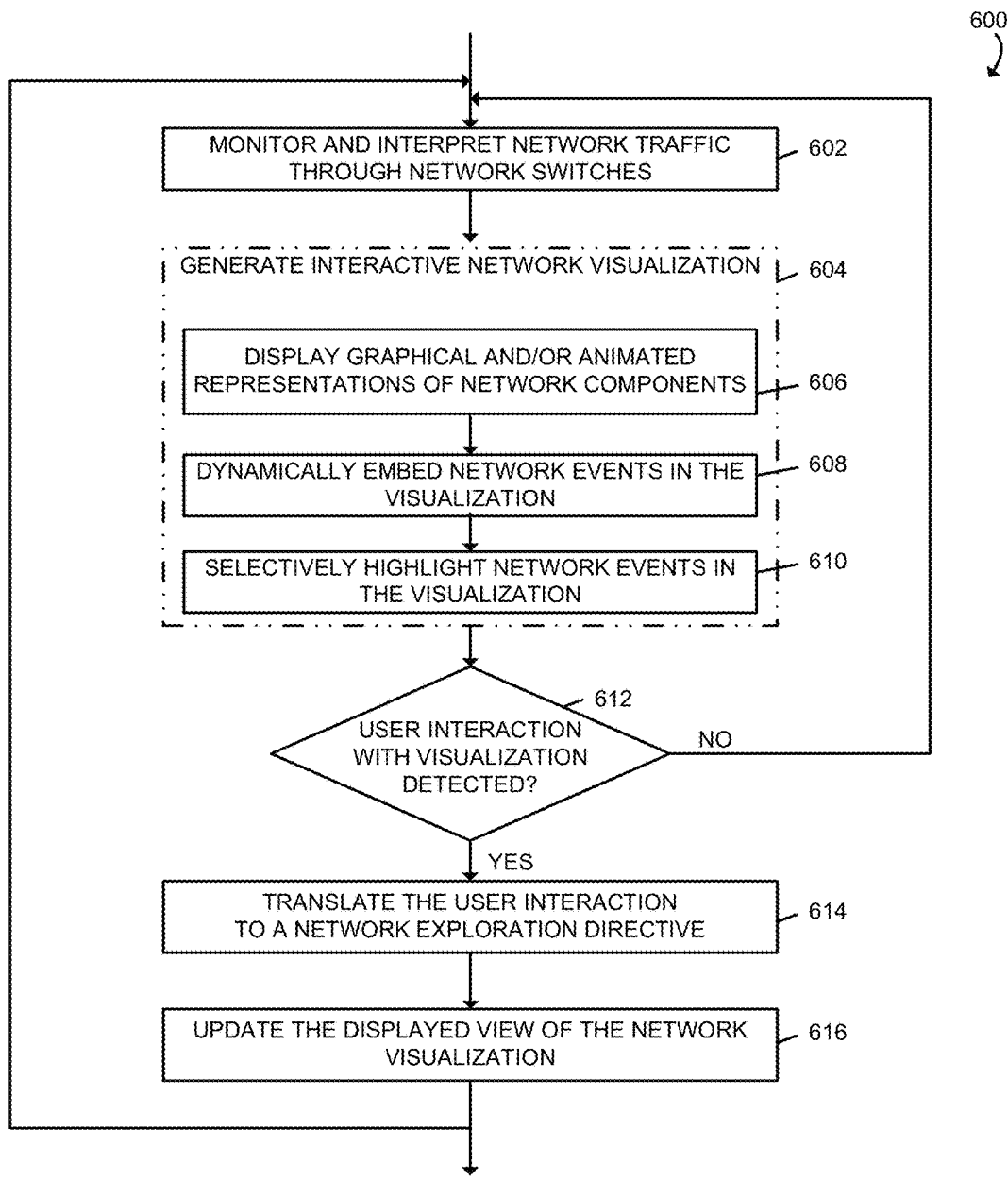
FIG. 6 is a simplified flow diagram of at least one embodiment of a method by which the computing system of FIG. 1 may provide an interactive visualization of a computer network.

Referring now to FIG. 6, an illustrative method 600 for generating an interactive network visualization and initiating network exploration directives is shown. The method 600 may be embodied as computerized programs, routines, logic, and/or instructions of the computing system 100, e.g., hardware, firmware, software or a combination thereof, as part of the various components of the network security management system 110, for example (e.g., software code written in a programming language such as Java and/or Python). In block 602, the computing system 100 monitors and interprets network traffic passing through the network switching devices (e.g., switches 160). To do this, one or more of the components of the network analytics subsystem 142, described above, may analyze network activity data (e.g., data 140) and correlate the network activity data with network intelligence data, such as network topology data, infection profile data, IP reputation data, and/or other current, historical, and/or predictive information about the behavior of the network 150. Such data may be obtained from systems that are internal or external to the network security management system 110 and used by the computing system 100 to determine the current network context (e.g., context 144).

Block 604 represents a number of functions or processes that may be performed by the computing system 100 concurrently or iteratively in some embodiments, to generate and update the interactive network visualization (e.g., visualization 114) responsively to the current network context (e.g., context 144), network events, and user interactions 120. In block 606, the computing system 100 displays graphical and/or animated representations of network components in the current network context. To do this, the system 100 maps characteristics of the current network context to associated graphical elements and creates or updates the visualization, accordingly. In block 608, the computing system 100 dynamically embeds graphical elements representative of network events in the visualization generated in block 606. The display of graphical elements indicative of network events changes over time as new network events appear and older network events are remediated or discontinue for other reasons, in block 608. For example, nodes or flows on the network visualization may be highlighted dynamically in response to the occurrence of network events or un-highlighted in response to the network events being remediated (e.g., by user interactions 120).

At block 612, the computing system 100 determines whether a user interaction with the network visualization has occurred. To do this, the computing system 100 may read data output by one or more of the user interaction detection devices (e.g., devices 106) and interpret the user interaction data (e.g., data 120) using, e.g., one or more interaction models (e.g., models 414, 416). If the computing system 100 does not detect a relevant user interaction in block 612, the computing system 100 continues the dynamic display of the interactive visualization, by returning to block 602. If the computing system 100 detects a user interaction with the visualization, in block 612, the system 100 translates the user interaction to a network directive (e.g., a network exploration directive 118), in block 614. To do this, the computing system 100 may utilize an interaction model (e.g., models 414, 416) to interpret the user interaction as a request to manipulate the view of the visualization generated in block 604. In block 616, the computing system 100 updates the visualization generated in block 604 to include or modify graphical elements of the visualization as may be needed in order in response to the user interaction detected in block 612. Following block 616, the computing system 100 may, for example, return to block 602 or end.

Figure 7A:
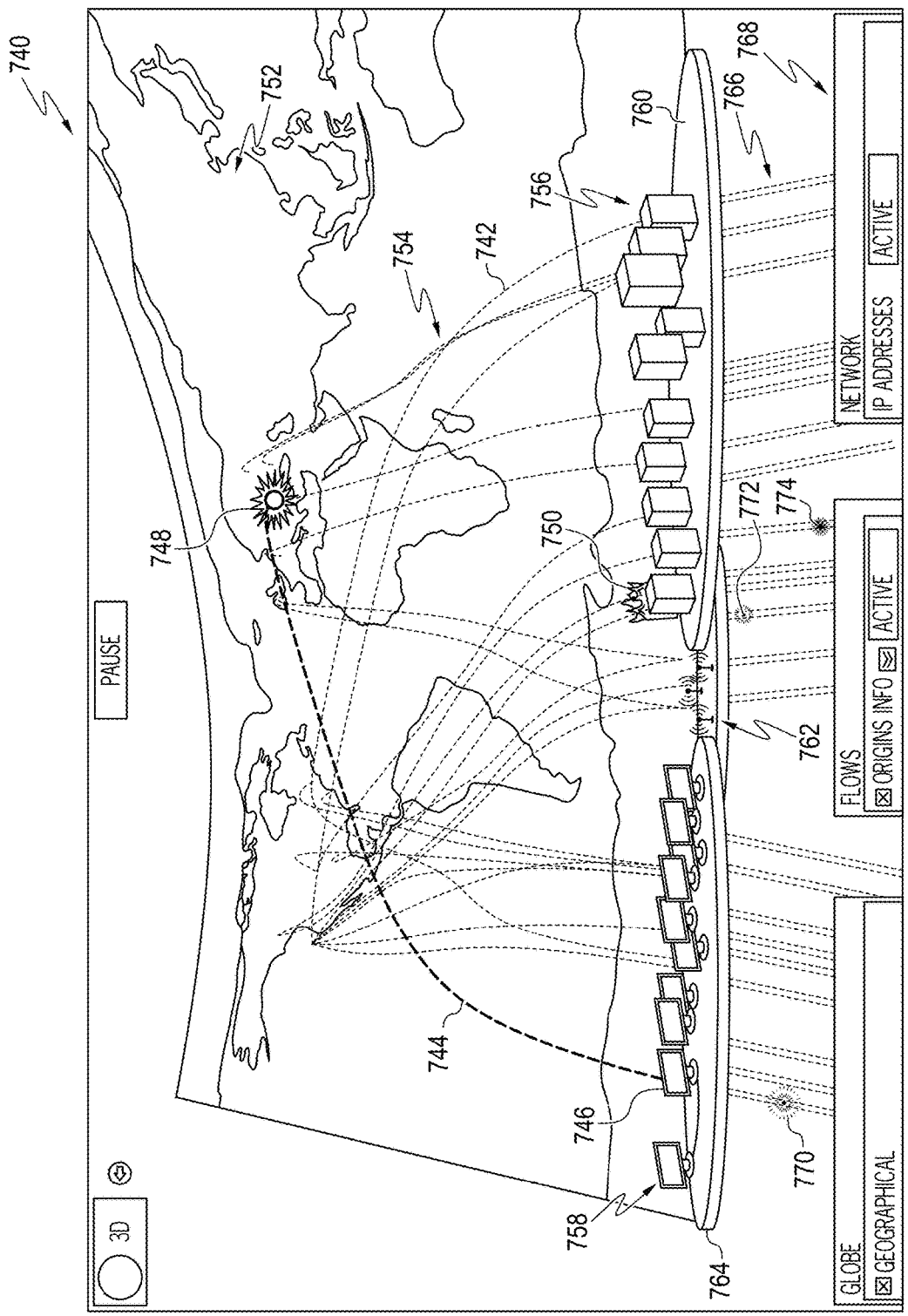
FIGS. 7A-7D are illustrative example embodiments of interactive visualizations of a computer network as disclosed herein.

Referring now to FIGS. 7A-7D, illustrative examples of interactive network visualizations as disclosed herein are shown. In FIG. 7A, an interactive visualization 740 illustrates the current context of a network, including the network topology and the links connecting nodes and peripheral devices. The visualization 740 includes icon-like graphical elements that allow the user to easily visually distinguish the different types of devices on the network. The visualization 740 also allows the user to quickly identify which portions of the network are at risk and which portions are currently running normally. For example, the graphical elements representing nodes or flows may be overlaid with event-indicating graphics (such as a "flame" or other marker) if the node or flow is currently experiencing a network event. The event-indicating graphics may be removed if the status of the node changes. Additionally, intuitive icon-like graphical elements can be used to allow the user to quickly identify various different types of network threats. For example, different graphical elements can be designated as representing different types of network threats. The visualization 740 is interactive using, e.g., touch-based technology. For example, tapping on or pointing to a node or flow graphical element can cause the visualization 740 to present the user with additional details about the current context of the specified node or flow.

FIGS. 7A, 7B, 7C, and 7D present multiple different exemplary views of a three-dimensional, virtual world, game-like visualization of a computer network. Each of the FIGS. 7A, 7B, 7C, and 7D shows a different presentation of the same computer network from a different point of reference. The point of reference can be changed intuitively by user interactions such as gestures, or by combinations of user interactions such as gestures and speech. In the view 740, the nodes on the network administrator's network are arranged by node type, on different "plates." For example, servers 756 are presented on a plate 760, client devices 758 are presented on a plate 764, and wireless devices 762 are presented on a plate 763. The graphical elements used to depict the nodes intuitively identify the device type. The current network flows between the internal nodes 758, 762, 756 and external nodes are shown by flow lines 754, e.g., line 742 and line 744. The geographic locations of the external nodes with which the internal nodes are currently communicating are illustrated intuitively by a geographic map 752. Thus, the network administrator can quickly see whether any nodes are connecting with external nodes in a geographic region that may be of concern from a network security perspective. In the illustrative example, the node 746 has connected with an at risk external node 748. This network event is depicted by graphical elements highlighting the at risk node 748 and also the network flow 744. In some embodiments, the network flows, e.g., lines 742, 744, may be animated to show the direction of flow (e.g., from source to destination). Another network event is indicated by highlighting the node 750 (e.g., "on fire"). Also shown in FIG. 7A are textual data indicative of the current network context, 768, and connection duration graphics 766. The illustrative connection duration graphics 766 indicate the length of time that a node has been connected to another node using a "waterfall" approach in which the length of the graphical elements 766 is representative of the length of time of the connection (e.g. longer length of waterfall corresponds to longer connection time and vice versa). Graphical elements 770, 772, and 774 indicate network events occurring during these connections 766 and the connections 766 associate the events 770, 772, 774 with their respective nodes.

Figure 7B:
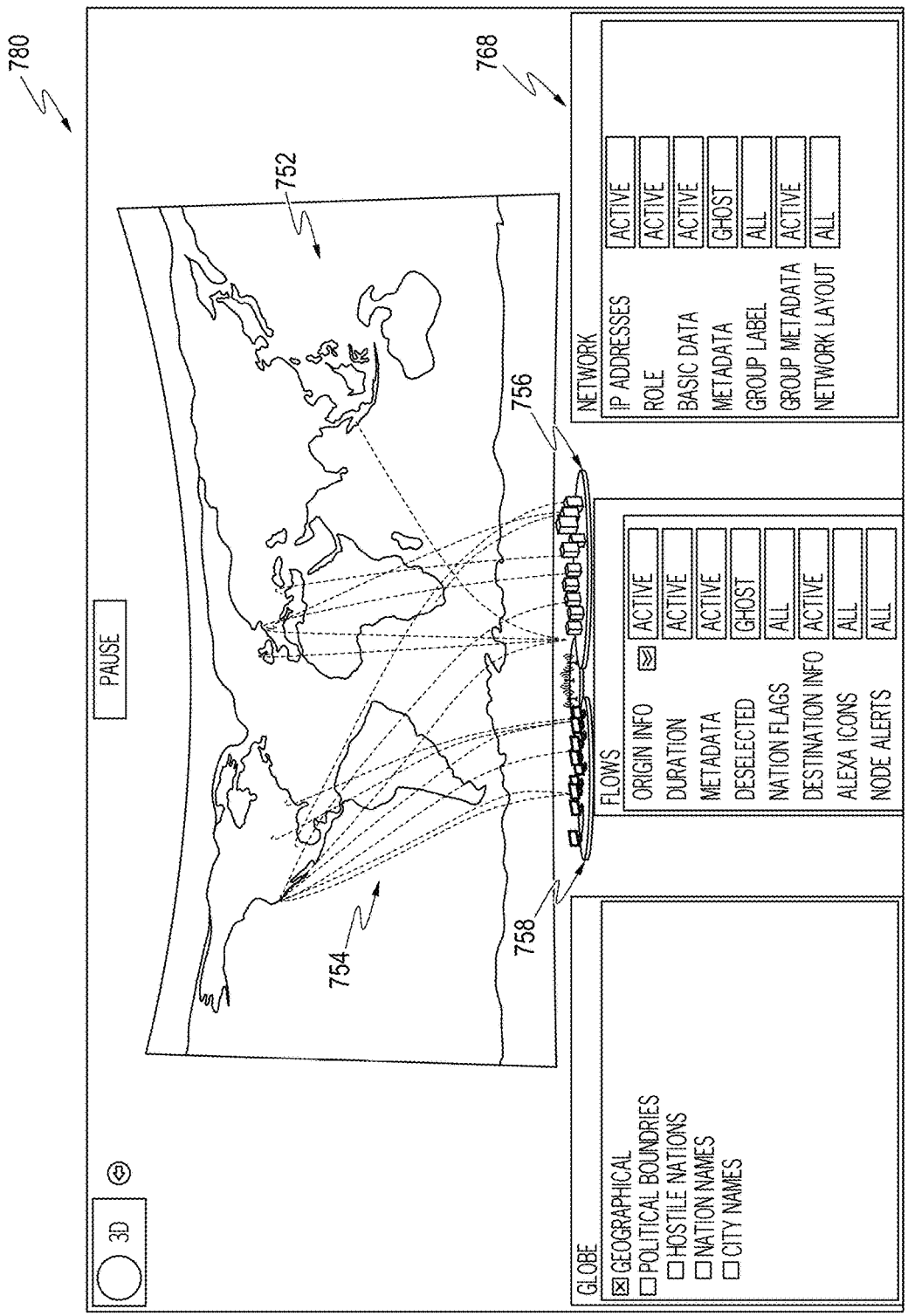
Figure 7C:
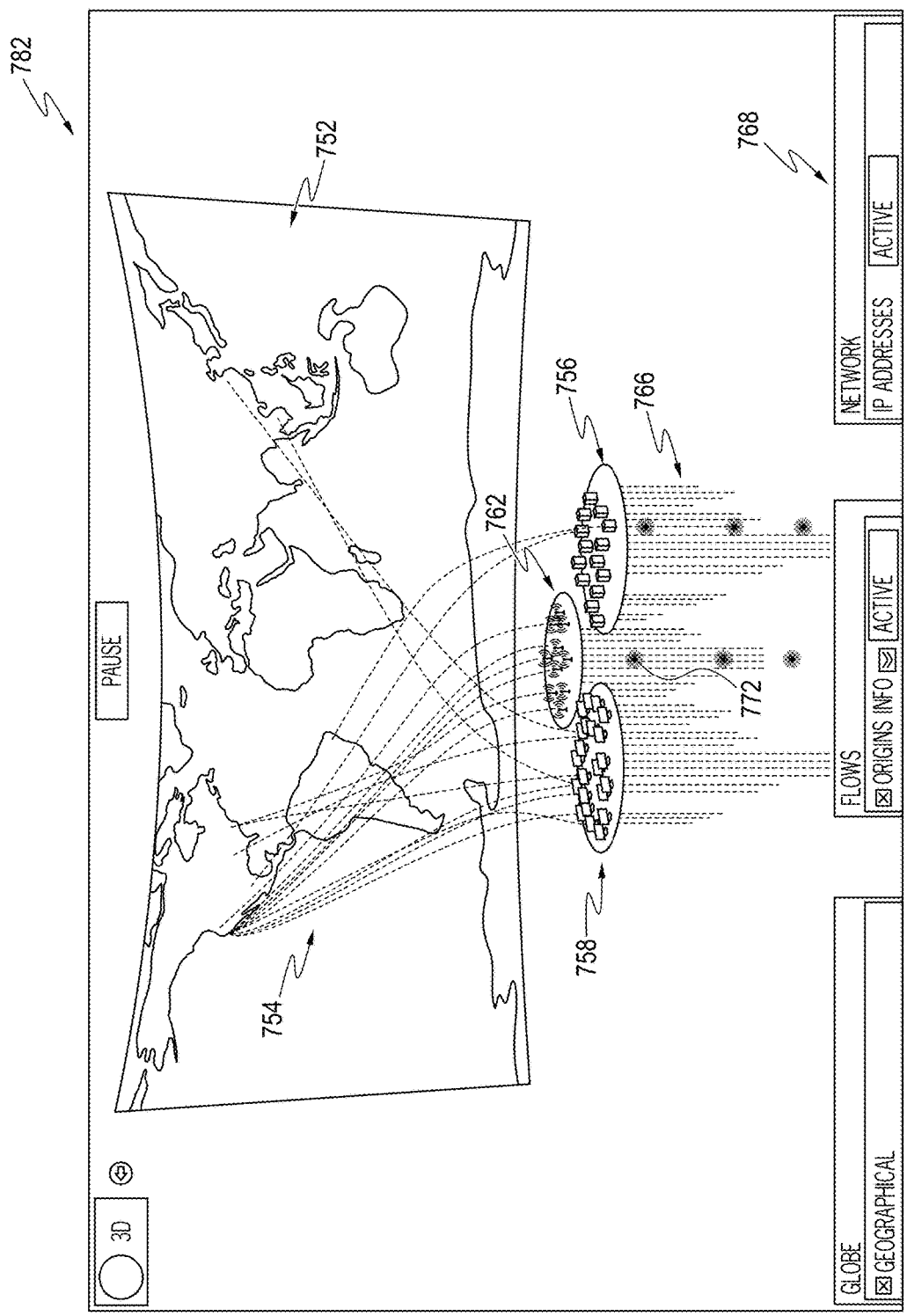
Figure 7D:
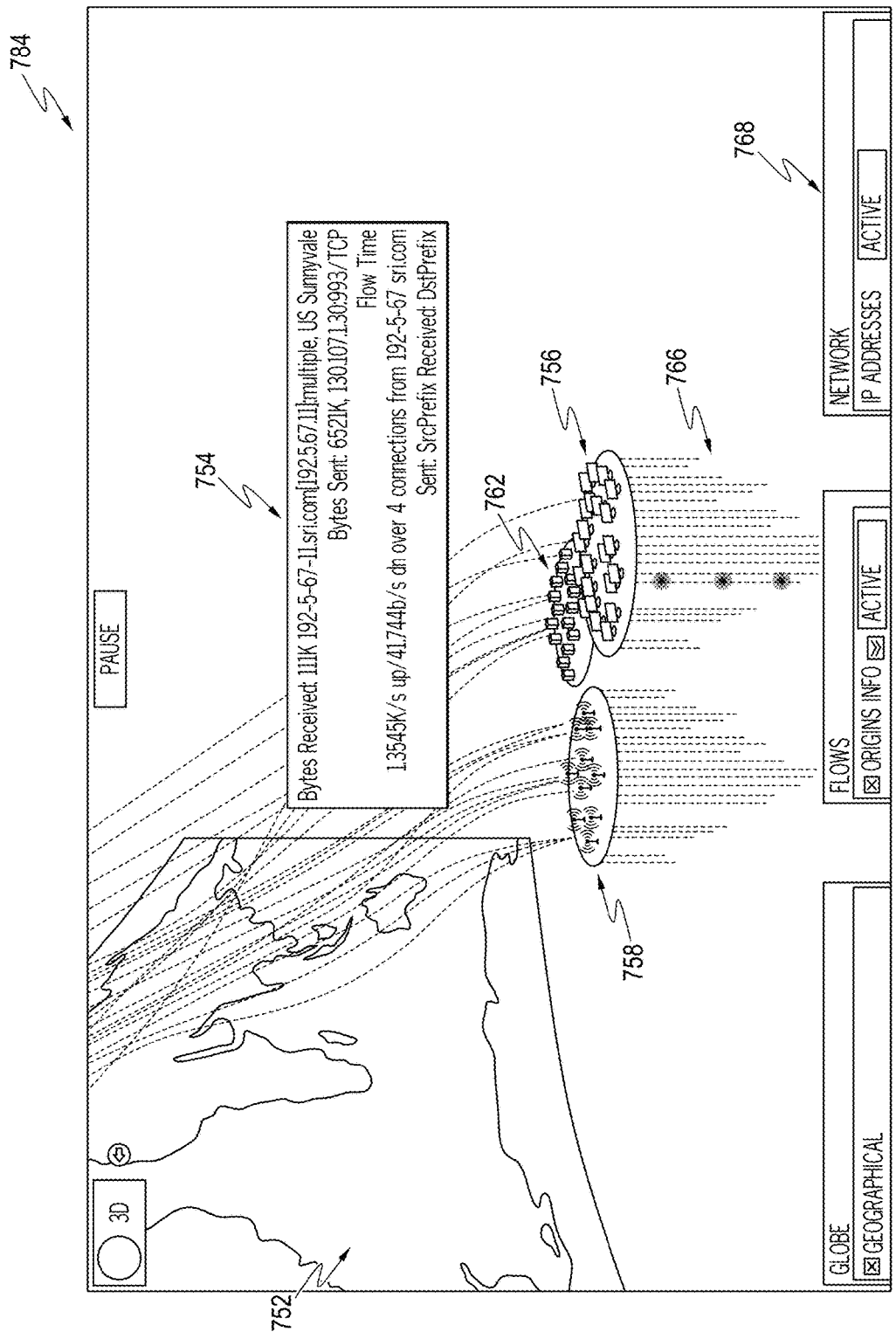

The view 780 of FIG. 7B illustrates a "zoomed out" view of the network shown in FIG. 7A. The user can cause the visualization to move from the view of FIG. 7A to the view of FIG. 7B by a simple gesture or other intuitive form of user interaction with the computing system 100. As such, the view 780 shows more of the textual details 768, which are reflective of the current network context 144. The view 782 of FIG. 7C shows a "zoomed out" view of the network shown in FIG. 7B. In the view 782, the user can easily see the connection duration information 766. Again, moving from either of the views 740, 780 to the view 782 can be initiated by a gesture-based interaction. The view 784 of FIG. 7D illustrates the interactive capabilities of the visualization, in that tapping on the display screen (or performing some other type of gesture-based interaction) results in the display of current network context details 754 relating to a specific network flow. Thus, if the network administrator needs more information about any of the flows represented by graphical elements, the administrator may simply tap on or point to the flow of interest and the system 100 displays the current context details 754. It should be noted that the current context details 754 are updated in response to changing network conditions, e.g., in real time or as the network analytics subsystem 142 described above updates the current network context 144 and network events 146.

Figure 8:
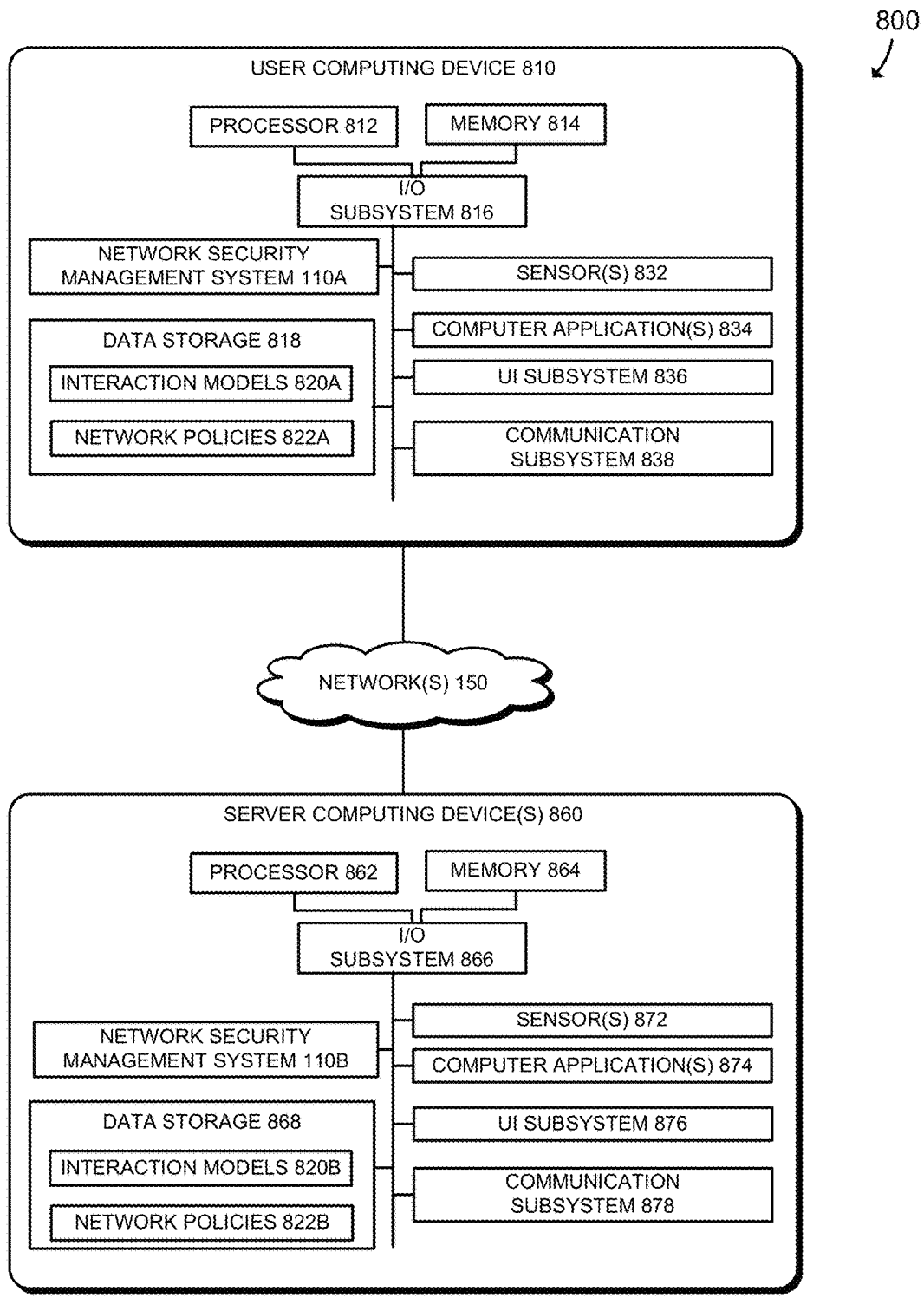
FIG. 8 is a simplified block diagram of an exemplary computing environment in connection with which at least one embodiment of the network security management system of FIG. 1 may be implemented.

Referring now to FIG. 8, a simplified block diagram of an embodiment 800 of the computing system 100 is shown. While the illustrative computing system 800 is shown as involving multiple computing devices, it should be understood that in some embodiments, the computing system 800 may constitute a single computing device, alone or in combination with other devices. The computing system 800 includes a user computing device 810, which may be in communication with one or more server computing devices 860 via one or more networks or honeynets 150. The network security management system 110, or portions thereof, may be distributed across multiple computing devices 810, 860 that are connected to the network(s) 150 as shown. In other embodiments, however, network security management system 110 may be located entirely on the computing device 810. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by a network application, a network controller, a network switching device, and/or other systems and devices.

The illustrative computing device 810 includes at least one processor 812 (e.g. a microprocessor, microcontroller, digital signal processor, etc.), memory 814, and an input/output (I/O) subsystem 816. The computing device 810 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 may be embodied as any type of suitable computer memory device (e.g., volatile memory such as various forms of random access memory).

The I/O subsystem 816 is communicatively coupled to a number of hardware and software components and/or other computing systems including a "front end" of the network security management system 110A, a user interface subsystem 836, which includes one or more user input devices (e.g., one or more microphones, touchscreens, keyboards, virtual keypads, etc.) and one or more output devices (e.g., speakers, displays, LEDs, haptic devices, etc.). The I/O subsystem 816 is also communicatively coupled to a number of sensors 832 (e.g., user interaction detection devices 106), one or more data storage media 818, and a communication subsystem 838. It should be understood that each of the foregoing components and/or systems may be integrated with the computing device 810 or may be a separate component or system that is in communication with the I/O subsystem 816 (e.g., over a network 150 or a serial bus connection).

The data storage media 818 may include one or more hard drives or other suitable data storage devices (e.g., flash memory, memory cards, memory sticks, and/or others). In some embodiments, portions of the network security management system 110A, interaction models 820A (e.g., models 414, 416), network policies 822B (e.g., policies 228) and/or other data (e.g., network activity data 140, network topology data 220, infection profile data 222, IP reputation data 224, network role data 226, mapping 328, repository 330, rules and templates 332, 334) and/or other data reside at least temporarily in the data storage media 818. Portions of the network security management system 110A and/or other data may be copied to the memory 814 during operation of the computing device 810, for faster processing or other reasons.

The communication subsystem 838 may communicatively couple the computing device 810 to one or more communication networks 150, e.g., a local area network, wide area network, personal cloud, enterprise cloud, public cloud, and/or the Internet, for example. Accordingly, the communication subsystem 838 may include one or more wired or wireless network interface software, firmware, or hardware, for example, as may be needed pursuant to the specifications and/or design of the particular computing system 100.

The server computing device(s) 860 may be embodied as any suitable type of computing device capable of performing the functions described herein, such as any of the aforementioned types of devices or other electronic devices. For example, in some embodiments, the server computing device(s) 860 may include one or more server computers including data storage media 768, which may be used to store "back end" portions of the network security management system 110B, interaction models 820B (e.g., models 414, 416), network policies 822B (e.g., policies 228) and/or other data (e.g., network activity data 140, network topology data 220, infection profile data 222, IP reputation data 224, network role data 226, mapping 328, repository 330, rules and templates 332, 334). The illustrative server computing device 860 includes one or more processors 862, memory 864, an I/O subsystem 866, data storage media 868, sensors 872, computer applications 874, a user interface subsystem 876, and a communication subsystem 878, each of which may be embodied similarly to the corresponding components of the user computing device 810, respectively, described above. The computing system 800 may include other components, sub-components, and devices not illustrated in FIG. 8 for clarity of the description. In general, the components of the computing system 800 are communicatively coupled as shown in FIG. 8 by signal paths, which may be embodied as any type of wired or wireless signal paths capable of facilitating communication between the respective devices and components.

ADDITIONAL EXAMPLES

Illustrative examples of the technologies disclosed herein are provided below. An embodiment of the technologies may include any one or more, and any combination of, the examples described below.

In an example 1, a network security management system includes one or more computing devices configured to: receive data indicative of a current context of a computer network in live operation; select a plurality of graphical elements to represent the current context of the computer network; generate a game-like interactive visualization of the live operation of the network including the selected graphical elements; by a display device, present a view of the game-like interactive visualization; interpret a gesture-based user interaction with the computing system in relation to at least a portion of the game-like interactive visualization as a network exploration directive; determine a different view of the game-like interactive visualization responsive to the network exploration directive; and by the display device, present the different view of the game-like interactive visualization.

An example 2 includes the subject matter of example 1, and is configured to present a three-dimensional view of the live operation of the computer network according to a point of reference, and in response to a gesture-based interaction, generate a different three-dimensional view of the live operation of the computer network according to a different point of reference. An example 3 includes the subject matter of example 1 or example 2, and is configured to represent a network flow of the computer network as one or more animated graphical elements. An example 4 includes the subject matter of example 3, and is configured to represent a direction of a network flow of the computer network by a direction of motion of the one or more animated graphical elements. An example 5 includes the subject matter of any of examples 1-4, and is configured to dynamically represent a duration of a network connection between two nodes of the computer network by increasing a dimension of a graphical element associated with the network connection as the duration of the network connection increases. An example 6 includes the subject matter of any of examples 1-5, and is configured to represent a hardware or software configuration of a network node by a graphical element comprising a logo or icon indicative of the hardware or software configuration. An example 7 includes the subject matter of any of examples 1-6, and is configured to, in response to detection of a network security event on the network, apply a graphical security event indicator to a graphical element that represents, in the interactive visualization, a component of the computer network involved in the network security event. An example 8 includes the subject matter of any of examples 1-7, and is configured to, in response to detection of a network security event on the network, change the color of a graphical element that represents, in the interactive visualization, a component of the computer network involved in the network security event. An example 9 includes the subject matter of any of examples 1-8, and is configured to update the game-like interactive visualization in an automated fashion as the current context of the computer network changes over time. An example 10 includes the subject matter of any of examples 1-9, and is configured to zoom in to a view of a smaller portion of the computer network in response to a gesture-based interaction. An example 11 includes the subject matter of any of examples 1-10, and is configured to zoom out to a view of a larger portion of the computer network in response to a gesture-based interaction. An example 12 includes the subject matter of any of examples 1-11, and is configured to present a three-dimensional geographic map and graphically represent network flow endpoints at corresponding locations on the three-dimensional geographic map.

In an example 13, a method for interactively visualizing a computer network in live operation, with a computing system comprising one or more computing devices, includes: selecting a plurality of graphical elements indicative of a current context of a computer network; generating a game-like interactive visualization of the live operation of the network including the selected graphical elements; by a display device, presenting a view of the game-like interactive visualization; interpreting a gesture-based user interaction relating to at least a portion of the game-like interactive visualization as a network exploration directive; responsive to the network exploration directive, executing a query; generating a different view of the game-like interactive visualization, the different view comprising one or more query results; and by the display device, presenting the different view of the game-like interactive visualization of the network.

An example 14 includes the subject matter of example 13, comprising presenting a three-dimensional view of the live operation of the computer network according to a point of reference, and in response to a gesture-based interaction, generating a different three-dimensional view of the live operation of the computer network according to a different point of reference. An example 15 includes the subject matter of example 13 or example 14, comprising representing a network flow of the computer network as one or more animated graphical elements, and represent a direction of a network flow of the computer network by a direction of motion of the one or more animated graphical elements. An example 16 includes the subject matter of any of examples 13-15, and includes dynamically representing a duration of a network connection between two nodes of the computer network by increasing a dimension of a graphical element associated with the network connection as the duration of the network connection increases. An example 17 includes the subject matter of any of examples 13-16, and includes, in response to detection of a network security event on the network, applying a graphical security event indicator to a graphical element that represents, in the interactive visualization, a component of the computer network involved in the network security event. An example 18 includes the subject matter of any of examples 13-17, comprising updating the game-like interactive visualization in an automated fashion as the current context of the computer network changes over time.

In an example 19, an interactive network security management system includes, embodied in one or more non-transitory machine accessible storage media, instructions configured to cause one or more computing devices to: determine a current context of a computer network; generate a game-like interactive visualization of the live operation of the network, including a plurality of graphical elements, the game-like interactive visualization graphically depicting the current context of the network; by a display device, present a view of the game-like interactive visualization; interpret a gesture-based user interaction relating to at least a portion of the game-like interactive visualization as a network exploration directive; determine a different view of the game-like interactive visualization responsive to the network exploration directive; and by the display device, present the different view of the game-like interactive visualization of the network.

An example 20 includes the subject matter of example 19, and includes, in response to detection of a network security event on the network, applying a graphical security event indicator to a graphical element that represents, in the interactive visualization, a component of the computer network involved in the network security event, and updating the game-like interactive visualization in an automated fashion as the current context of the computer network changes over time.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof (e.g., software code written in a programming language such as Java and/or Python). Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A system that enables users to quickly identify at-risk nodes of a managed computer network based on connections to external geographic regions, the system comprising:
   one or more computing devices;
   a plurality of processor-executable computer application components embodied in the one or more computing devices, the plurality of computer application components comprising:
   a network analytics subsystem that, when executed by the one or more computing devices, is to determine a current context of the managed computer network;
   a network visualization subsystem communicatively coupled to the network analytics subsystem to:
   using the current context, generate an interactive graphical visualization of the managed computer network;
   interface with a display device to display a view of the interactive graphical visualization that includes a first graphical element indicative of a node on the managed computer network, a second graphical element indicative of a geographic region that is outside the managed computer network, and a third graphical element indicative of a network connection between the node on the managed computer network and the geographic region that is outside the managed computer network;
   wherein the display of the interactive graphical visualization is to provide an interactive display of activity between the managed computer network and one or more geographic regions that are outside the managed computer network;
   wherein an at-risk node of the managed computer network is identified based on the display of the view of the interactive graphical visualization that includes the first graphical element and the second graphical element and the third graphical element.

2. The system of claim 1, wherein the interactive graphical visualization comprises three dimensional graphical elements that can be visually rotated in response to the interaction.

3. The system of claim 1, wherein the interactive graphical visualization comprises an animated graphical element configured to represent a network flow of the computer network.

4. The system of claim 3, wherein the animated graphical element is configured to represent a direction of the network flow by simulating motion in the direction of the network flow.

5. The system of claim 1, wherein the interactive graphical visualization is configured to represent a duration of a network connection between two nodes of the computer network by dynamically increasing a dimension of a graphical element associated with the network connection as the duration of the network connection increases.

6. The system of claim 1, wherein the interactive graphical visualization is configured to represent a hardware or software configuration of a network node by a graphical element comprising a logo or an icon indicative of the hardware or software configuration.

7. The system of claim 1, wherein the network visualization subsystem is configured to, in response to detection of a network security event on the network, apply a graphical security event indicator to a graphical element that represents, in the interactive graphical visualization, a component of the computer network involved in the network security event.

8. The system of claim 1, wherein the network visualization subsystem is configured to, in response to detection of a network security event on the network, change a color of a graphical element that represents, in the interactive graphical visualization, a component of the computer network involved in the network security event.

9. The system of claim 1, wherein the network visualization subsystem comprises a game engine configured to update the interactive graphical visualization in an automated video game-like fashion as the current context of the computer network changes over time.

10. The system of claim 1, wherein the network visualization subsystem is configured to cause the interactive graphical visualization to zoom to a more detailed view of a smaller portion of the topology of the computer network in response to a detection by the interaction handling subsystem of a gesture-based interaction.

11. The system of claim 1, wherein the network visualization subsystem is configured to cause the interactive graphical visualization to zoom out to a view of a larger portion of the topology of the computer network to a detection by the interaction handling subsystem of a gesture-based interaction.

12. The system of claim 1, configured to present a three-dimensional geographic map of the Earth and graphically represent network flow endpoints at corresponding locations on the three-dimensional geographic map.

13. The system of claim 1, wherein the display device is coupled to a mobile computing device.

14. The system of claim 1, wherein the display device is coupled to a wearable computing device.

15. A method that enables users to quickly identify at-risk nodes of a managed computer network based on connections to external geographic regions, performed by a plurality of processor-executable computer application components embodied in one or more computing devices, the method comprising:
   determining a current context of the managed computer network;
   using the current context, generating an interactive graphical visualization of the computer network;
   displaying a view of the interactive graphical visualization that includes a first graphical element indicative of a node on the managed computer network, a second graphical element indicative of a geographic region that is outside the managed computer network, and a third graphical element indicative of a network connection between the node on the managed computer network and the geographic region that is outside the managed computer network,
   wherein the display of the interactive graphical visualization is to provide an interactive display of activity between the managed computer network and one or more geographic regions that are outside the managed computer network;
   wherein an at-risk node of the managed computer network is identified based on the display of the view of the interactive graphical visualization that includes the first graphical element and the second graphical element and the third graphical element.

16. The method of claim 15, wherein the interactive graphical visualization comprises one or more three dimensional graphical elements that can be rotated in response to the interaction.

17. The method of claim 15, wherein the interactive graphical visualization comprises an animated graphical element configured to represent a network flow of the computer network.

18. The method of claim 17, comprising representing a direction of the network flow by simulating motion in the direction of the network flow.

19. The method of claim 15, comprising representing a duration of a network connection between two nodes of the computer network by dynamically increasing a dimension of a graphical element associated with the network connection as the duration of the network connection increases.

20. The method of claim 15, comprising representing a hardware or software configuration of a network node by a graphical element comprising a logo or an icon indicative of the hardware or software configuration.

21. The method of claim 15, comprising, in response to detection of a network security event on the network, applying a graphical security event indicator to a graphical element that represents, in the interactive graphical visualization, a component of the computer network involved in the network security event.

22. The method of claim 15, comprising, in response to detection of a network security event on the network, changing a color of a graphical element that represents, in the interactive graphical visualization, a component of the computer network involved in the network security event.

23. The method of claim 15, comprising updating the interactive graphical visualization in an automated video game-like fashion as the current context of the computer network changes over time.

24. The method of claim 15, comprising causing the interactive graphical visualization to zoom to a more detailed view of a smaller portion of the topology of the computer network in response to a detection by the interaction handling subsystem of a gesture-based interaction.

25. The method of claim 15, comprising causing the interactive graphical visualization to zoom out to a view of a larger portion of the topology of the computer network to a detection by the interaction handling subsystem of a gesture-based interaction.

26. The method of claim 15, comprising presenting a three-dimensional geographic map of the Earth and graphically represent network flow endpoints at corresponding locations on the three-dimensional geographic map.

27. The method of claim 15, comprising displaying the interactive graphical visualization on a display device that is coupled to a mobile computing device.

28. The method of claim 15, comprising displaying the interactive graphical visualization on a display device that is coupled to a wearable computing device.

29. A computer-program product embodied in a non-transitory machine-readable storage medium, including instructions that, when executed by one or more processors, cause the one or more processors to enable users to quickly identify at-risk nodes of a managed computer network based on connections to external geographic regions by performing operations comprising:
   determining a current context of the managed computer network;
   using the current context, generating an interactive graphical visualization of the computer network;
   displaying a view of the interactive graphical visualization that includes a first graphical element indicative of a node on the managed computer network, a second graphical element indicative of a geographic region that is outside the managed computer network, and a third graphical element indicative of a network connection between the node on the managed computer network and the geographic region that is outside the managed computer network,
   wherein the display of the interactive graphical visualization is to provide an interactive display of activity between the managed computer network and one or more geographic regions that are outside the managed computer network;
   wherein an at-risk node of the managed computer network is identified based on the display of the view of the interactive graphical visualization that includes the first graphical element and the second graphical element and the third graphical element.

30. The computer-program product of claim 29, wherein the interactive graphical visualization comprises an animated graphical element configured to represent a network flow of the computer network and representing a direction of the network flow by simulating motion in the direction of the network flow.

31. The computer-program product of claim 29, comprising representing a duration of a network connection between two nodes of the computer network by dynamically increasing a dimension of a graphical element associated with the network connection as the duration of the network connection increases.

32. The computer-program product of claim 29, comprising, in response to detection of a network security event on the network, applying a graphical security event indicator to a graphical element that represents, in the interactive graphical visualization, a component of the computer network involved in the network security event.

33. The computer-program product of claim 29, comprising updating the interactive graphical visualization in an automated video game-like fashion as the current context of the computer network changes over time.

34. The computer-program product of claim 29, comprising causing the interactive graphical visualization to zoom to a more detailed view of a smaller portion of the topology of the computer network in response to a detection by the interaction handling subsystem of a gesture-based interaction and to zoom out to a view of a larger portion of the topology of the computer network to a detection by the interaction handling subsystem of a gesture-based interaction.

35. The computer-program product of claim 29, comprising presenting a three-dimensional geographic map of the Earth and graphically represent network flow endpoints at corresponding locations on the three-dimensional geographic map.

36. The computer-program product of claim 29, comprising displaying the interactive graphical visualization on a display device that is coupled to a mobile computing device or a wearable computing device.

* * * * *